US011577682B1

(12) United States Patent
Bates et al.

(10) Patent No.: US 11,577,682 B1
(45) Date of Patent: Feb. 14, 2023

(54) VEHICLES AND OCCUPANT PROTECTION SYSTEMS HAVING AN EXPANDABLE BLADDER WITH SEQUENTIAL DEPLOYMENT

(71) Applicant: Zoox, Inc., Foster City, CA (US)

(72) Inventors: Mark Alan Bates, Kenilworth (GB); Swagat Goswami, Cupertino, CA (US); Goutham Shanmuga Sundaram, Fremont, CA (US); David Maurice Libeaut, Bidford-on-Avon (GB); Markus Jost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/555,206

(22) Filed: Dec. 17, 2021

(51) Int. Cl.
*B60R 21/232* (2011.01)
*B60R 21/214* (2011.01)
*B60R 21/2342* (2011.01)
*B60R 21/231* (2011.01)

(52) U.S. Cl.
CPC .......... *B60R 21/232* (2013.01); *B60R 21/214* (2013.01); *B60R 21/2342* (2013.01); *B60R 2021/23161* (2013.01)

(58) Field of Classification Search
CPC ........... B60R 2021/23388; B60R 2021/23382; B60R 2021/23384; B60R 2021/23386; B60R 2021/2338; B60R 21/233; B60R 2021/23308; B60R 2021/233316;
(Continued)

(56) References Cited

U.S. PATENT DOCUMENTS

| 3,774,936 A | 11/1973 | Barnett et al. |
| 5,470,103 A | 11/1995 | Vaillancourt et al. |
| 5,575,497 A | 11/1996 | Suyama et al. |

(Continued)

FOREIGN PATENT DOCUMENTS

| DE | 4212416 A1 | 11/1992 |
| DE | 10007343 A1 | 8/2001 |

(Continued)

OTHER PUBLICATIONS

Bustos et al. "Passenger Airbag; Bag in Roof (BIR)"; Cognitive Safety Systems; TRW Automotive, Apr. 1, 2014; 19 pages.

(Continued)

*Primary Examiner* — Paul N Dickson
*Assistant Examiner* — Tiffany L Webb
(74) *Attorney, Agent, or Firm* — EIP US LLP

(57) ABSTRACT

A vehicle occupant protection expandable bladder may comprise an initial expandable chamber, an occupant restraining expandable chamber and a releasable connection that is configured to connect the occupant restraining expandable chamber to the initial expandable chamber or to a vehicle. The vehicle occupant protection expandable bladder may be configured to be expanded from a stowed state to a deployed state in a vehicle. The deployed state may comprise a first phase in which gas flow from the initial expandable chamber to the occupant restraining expandable chamber is at least substantially restricted and a second phase in which gas flow from the initial expandable chamber to the occupant restraining chamber is unrestricted. The releasable connection may be configured to release the connection in the deployed state.

20 Claims, 9 Drawing Sheets

(58) Field of Classification Search
CPC ...... B60R 2021/23324; B60R 21/2334; B60R 21/2338
See application file for complete search history.

(56) References Cited

U.S. PATENT DOCUMENTS

| | | | |
|---|---|---|---|
| 6,123,355 | A | 9/2000 | Sutherland |
| 6,382,660 | B1 | 5/2002 | Starner et al. |
| 6,863,299 | B2 | 3/2005 | Schneider et al. |
| 6,913,280 | B2 | 7/2005 | Dominissini et al. |
| 6,932,380 | B2 | 8/2005 | Choi et al. |
| 7,195,276 | B2 | 3/2007 | Higuchi |
| 7,222,877 | B2 | 5/2007 | Wipasuramonton et al. |
| 7,364,185 | B2 | 4/2008 | Mori et al. |
| 7,726,684 | B2 | 6/2010 | Breed et al. |
| 7,762,579 | B2 | 7/2010 | Garner |
| 7,997,615 | B2 | 8/2011 | Jang |
| 8,403,358 | B2 | 3/2013 | Choi et al. |
| 8,573,634 | B2 | 11/2013 | Choi et al. |
| 8,807,593 | B2 | 8/2014 | Lee et al. |
| 9,004,526 | B2 | 4/2015 | Fukawatase et al. |
| 9,327,669 | B2 | 5/2016 | Jaradi et al. |
| 9,446,735 | B1 | 9/2016 | Jayasuriya et al. |
| 9,493,135 | B2 | 11/2016 | Fukawatase |
| 9,725,064 | B1 | 8/2017 | Faruque et al. |
| 9,789,840 | B2 | 10/2017 | Farooq et al. |
| 9,802,568 | B1 | 10/2017 | Larner |
| 9,969,346 | B2 | 5/2018 | Patel et al. |
| 9,994,182 | B1 | 6/2018 | Jaradi et al. |
| 10,246,043 | B2 | 4/2019 | Schneider |
| 10,266,145 | B2 | 4/2019 | Paxton et al. |
| 10,279,770 | B2 | 5/2019 | Faruque et al. |
| 10,315,609 | B2 | 6/2019 | Thomas |
| 10,407,018 | B2 | 9/2019 | Sundararajan et al. |
| 10,471,923 | B2 | 11/2019 | Jimenez et al. |
| 10,525,927 | B2 * | 1/2020 | Fischer ................ B60R 21/231 |
| 10,589,708 | B2 | 3/2020 | Cho et al. |
| 10,647,286 | B1 | 5/2020 | Dennis et al. |
| 10,688,955 | B2 * | 6/2020 | Shin ................ B60R 21/214 |
| 10,703,323 | B2 | 7/2020 | Jost et al. |
| 11,117,543 | B2 * | 9/2021 | Jimenez ................ B60R 21/232 |
| 11,358,559 | B2 | 6/2022 | Jost et al. |
| 2006/0097492 | A1 | 5/2006 | Bakhsh et al. |
| 2006/0226640 | A1 | 10/2006 | Prakah-Asante et al. |
| 2010/0140909 | A1 | 6/2010 | Jang |
| 2010/0225096 | A1 | 9/2010 | Bustos Garcia et al. |
| 2013/0197764 | A1 | 8/2013 | Thomas |
| 2014/0097601 | A1 | 4/2014 | Fukawatase et al. |
| 2014/0375033 | A1 | 12/2014 | Fukawatase |
| 2016/0031401 | A1 | 2/2016 | Jaradi et al. |
| 2016/0311393 | A1 | 10/2016 | Smith et al. |
| 2017/0225641 | A1 | 8/2017 | Faruque et al. |
| 2017/0267204 | A1 | 9/2017 | Farooq et al. |
| 2018/0065590 | A1 * | 3/2018 | Jindal ................ B60R 21/205 |
| 2018/0215338 | A1 | 8/2018 | Faruque et al. |
| 2018/0222432 | A1 | 8/2018 | Schneider |
| 2018/0272985 | A1 | 9/2018 | Nagasawa |
| 2019/0016291 | A1 | 1/2019 | Paxton et al. |
| 2019/0106073 | A1 | 4/2019 | Sundararajan et al. |
| 2019/0193666 | A1 | 6/2019 | Jost et al. |
| 2019/0202391 | A1 | 7/2019 | Cho et al. |
| 2019/0202394 | A1 | 7/2019 | Obayashi et al. |
| 2019/0381968 | A1 * | 12/2019 | Kwon ................ B60R 21/013 |
| 2020/0114855 | A1 * | 4/2020 | Deng ................ B60R 21/207 |
| 2020/0307495 | A1 | 10/2020 | Jimenez et al. |
| 2020/0307496 | A1 | 10/2020 | Jimenez et al. |
| 2020/0331419 | A1 | 10/2020 | Jost et al. |
| 2020/0406852 | A1 | 12/2020 | Fischer et al. |
| 2021/0024028 | A1 * | 1/2021 | Kanegae ............ B60R 21/2338 |

FOREIGN PATENT DOCUMENTS

| | | |
|---|---|---|
| GB | 2385303 A | 8/2003 |
| WO | 2005000638 A1 | 1/2005 |
| WO | 2012122997 A1 | 9/2012 |
| WO | 2018132332 A1 | 7/2018 |

OTHER PUBLICATIONS

"Passenger Airbag: Bag in Roof Technology"; TRW Occupant Safety Systems (2013); Jan. 17, 2018; 2 pages.
U.S. Appl. No. 17/836,208, filed Jun. 9, 2022.
United States non-final Office Action dated Nov. 19, 2018 for U.S. Appl. No. 15/693,641.
United States final Office Action dated Apr. 19, 2019 or U.S. Appl. No. 15/693,641.
United States non-final Office Action dated Aug. 28, 2020 for U.S. Appl. No. 16/368,603.
United States Notice of Allowance dated Dec. 16, 2020 for U.S. Appl. No. 16/368,603.
United States non-final Office Action dated Jun. 25, 2020 for U.S. Appl. No. 16/368,663.
United States final Office Action dated Nov. 30, 2020 for U.S. Appl. No. 16/368,663.
United States Advisory Action dated Mar. 26, 2021 for U.S. Appl. No. 16/368,663.

* cited by examiner

US 11,577,682 B1

VEHICLES AND OCCUPANT PROTECTION SYSTEMS HAVING AN EXPANDABLE BLADDER WITH SEQUENTIAL DEPLOYMENT

BACKGROUND

Airbags protect occupants of a vehicle from injury during a collision involving the vehicle. An airbag system may include an airbag and an inflator for providing the airbag with a gas to inflate the airbag. Upon involvement in a collision, airbags may rapidly inflate to create a cushion between the occupant and interior surfaces of the vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
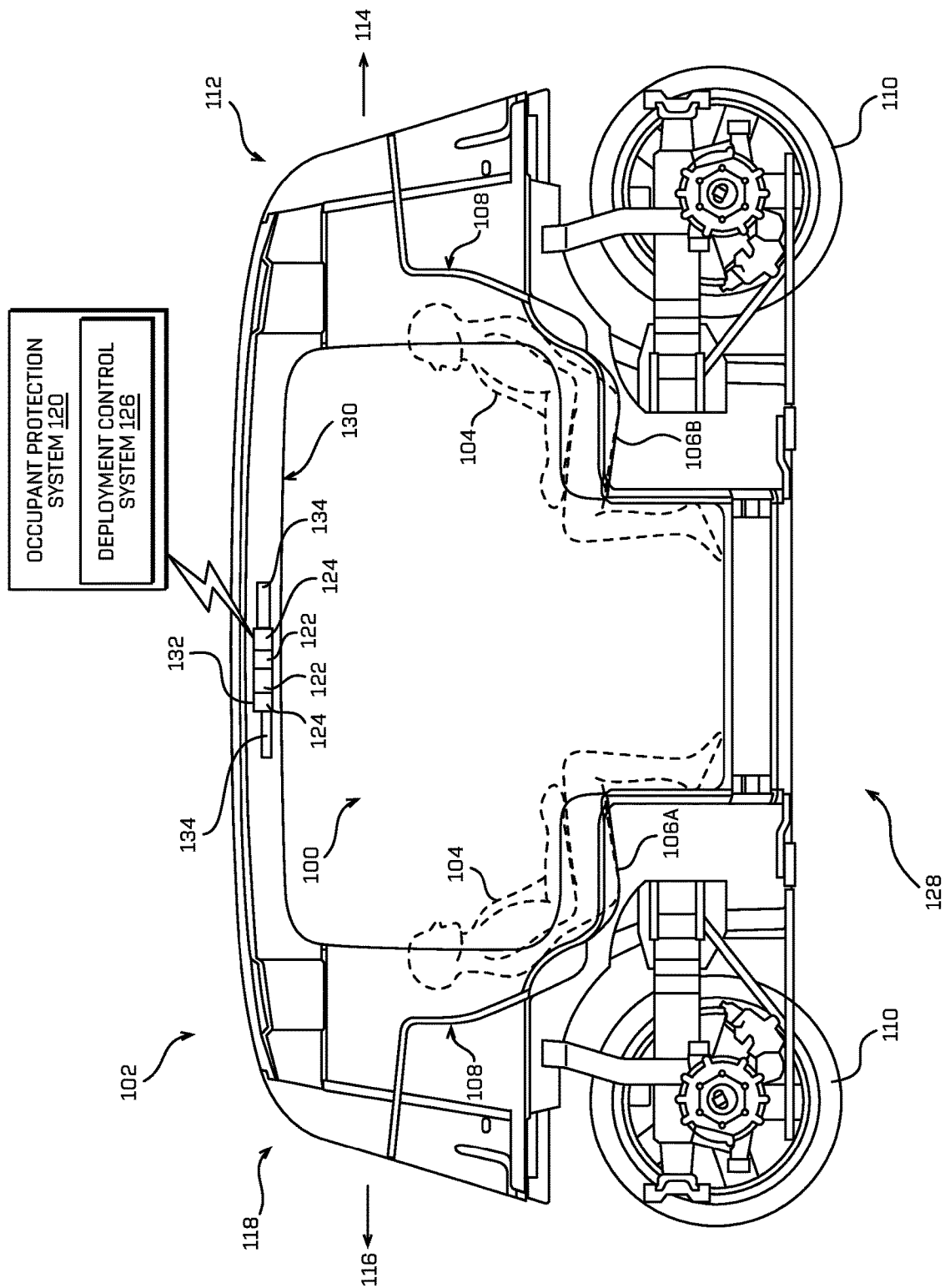
FIG. 1 is a cutaway side view of an example vehicle including an example occupant protection system.

Airbags may be used to protect occupants of a vehicle from injury during a collision involving the vehicle. An airbag system may include an airbag and an inflator for providing the airbag with a gas to inflate the airbag. Upon involvement in a collision, the airbag may be rapidly inflated to create a cushion between the occupant and interior surfaces of the vehicle. Different vehicle designs, however, may result in difficulty in protecting an occupant with an airbag or present other problems. For example, in a vehicle with carriage style seating, no steering wheel, and/or no instrument panel, airbags may be deployed from a roof area near a center of the interior of the vehicle. Such vehicle designs may have an excessive amount of space or distance between a seated occupant in the vehicle and the center of the vehicle, as well as an excessive amount of space or distance from the roof area to the floor of the vehicle. When airbags are deployed in such designs, they may not provide sufficient length in a downward direction or in a direction towards a seated occupant to effectively protect such occupants during a collision. This may be particularly problematic for occupants having relatively short heights, e.g., children or people with heights below a certain percentile or percentage of a population. Further, a significant amount of the energy used in deploying airbags may be imparted upon a face or body of an occupant during the airbag's deployment if, for example, the airbag and/or the position of the occupant relative to the airbag are not correct. This too can be especially problematic for relatively short occupants, or occupants that may be susceptible to injury from the imparting of such energy. Finally, airbag designs may be overly complicated and expensive to manufacture. Airbags may require an excessive amount of material, may take up too much space in a vehicle, and may require an excessive amount of energy for deployment, which may require excessively large gas inflators or an excessive amount of energy to operate gas inflators. Examples herein may address or mitigate the above-noted drawbacks and address other problems with existing airbags and occupant protection systems.

This disclosure is generally directed to occupant protection systems, vehicles with occupant protection systems and methods of utilizing occupant protections systems. In examples, an occupant protection system may have at least one airbag or expandable bladder that is configured to be expanded from a stowed state to a deployed state having two phases. In a first phase of the deployed state, the airbag may extend or drop generally downwardly from a roof of a vehicle, while in the second phase, the airbag may extend or move generally towards an occupant of the vehicle. In examples, the occupant protection system may comprise at least one airbag or expandable bladder having a first, initial expandable chamber and a second, occupant restraining expandable chamber. The expandable bladder may be configured to be expanded from the stowed state to a deployed state having two phases. In the first phase, gas may first flow into the initial expandable chamber and the first, initial expandable chamber may drop or extend in a direction generally downwards from the roof of the vehicle while the gas that flows into the initial expandable chamber may be least substantially or partially restricted from flowing into the second, occupant restraining expandable chamber. In the second phase of the deployed state, which occurs after the first phase in examples, the occupant restraining chamber may extend or move generally in a direction towards an occupant of the vehicle while gas that flows into the initial expandable chamber may be substantially unrestricted from flowing into the second, occupant restraining expandable chamber. In examples, the occupant protection system may include a deployment controller configured to cause the expandable bladder to expand from the stowed state to the deployed state.

FIG. 1 is a side cutaway view showing an interior 100 of an example vehicle 102 of the present disclosure including a pair of occupants 104. The example vehicle 102 may be configured to travel via a road network from one geographic location to a destination carrying one or more of the occupants 104. For example, interior 100 may include seats 106, which may be provided in any relative arrangement. Example vehicle 102 shown in FIG. 1 includes an example carriage-style seating arrangement in a substantially central portion of the interior 100 of the vehicle 102. For example, the vehicle 102 may include two or more rows 108 of seats 106, and in some examples, two of the rows 108 of seats 106 may face each other, for example, as shown in FIG. 1. One or more of the rows 108 of the seats 106 may include two seats 106 (e.g., seats 106A and 106B). Other relative arrangements and numbers of seats 106 are contemplated.

For purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems, vehicles occupant protection systems, expandable bladders and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the front end of the vehicle 102 when travelling in a first direction 114, and such that the first end 112 becomes the rear end of the vehicle 102 when traveling in the opposite, second direction 116, as shown in FIG. 1. Similarly, a second end 118 of the vehicle 102 is the front end of the vehicle 102 when travelling in the second direction 116, and such that the second end 118 becomes the rear end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. For example, the occupant protection system 120 may include one or more expandable bladders 124 and a deployment control system 126. The occupant protection system 120 may in examples further comprise one or more expandable curtain 122. The deployment control system 126 may be configured to control deployment of one or more of the expandable curtains 122 and one or more of the expandable bladders 124, so that they deploy from a stowed state, for example, as shown in FIG. 1, to a deployed state (e.g., expanded state), for example, as shown in FIG. 2 and FIGS. 3-8B. In some examples, the occupant protection system 120 may also include a seatbelt system that includes a seatbelt for each of one or more of the occupants 104, for example, as explained in more detail herein. The expandable curtain 122 and/or the expandable bladders 124 may be formed from, for example, a woven nylon fabric and/or other similar materials, or materials having suitable characteristics for the vehicles and occupant protection systems described herein.

As shown in FIG. 1, the example vehicle 102 may include a chassis 128 including a vehicle roof 130 having a housing 132 configured to receive the expandable curtain(s) 122 and/or the expandable bladder(s) 124, each in the stowed (e.g., unexpanded state). In some examples, the expandable curtain(s) 122 and/or expandable bladder(s) 124 may be stored individually in separate housings. In some examples (e.g., those examples where portions of the expandable curtain(s) are separate), each portion may be stored individually in separate housings. In some examples, upon receipt of one or more signals from the vehicle 102, the deployment control system 126 may be configured to activate one or more inflators 134 in fluid or flow communication with the expandable curtain(s) 122 and/or the expandable bladder(s) 124, such that the inflators 134 provide a fluid or gas to the expandable curtain(s) 122 and/or the expandable bladder(s) 124, so that that the expandable curtain(s) 122 and/or the expandable bladder(s) 124 may expand from their stowed state (FIG. 1) to their respective deployed states, for example, as shown in FIG. 2 and FIGS. 3-8B. For example, the inflators 134 may include a gas generator, pyrotechnic charge, propellants, and/or any other suitable devices or systems. The expandable curtain(s) 122 and/or expandable bladder(s) 124 may be configured to deploy in, for example, less than 100 milliseconds or less than 50 milliseconds (e.g., the second phase of the deployed state discussed herein may in examples be completed in less than 100 or less than 50 milliseconds). In one example the expandable bladder may be configured to expand in 70 milliseconds. In one example, the first phase of the deployed state described herein may occur in 45 milliseconds or less. As explained herein, the expandable curtain(s) 122 and/or the expandable bladder(s) 124, in the deployed state may protect an occupant 104 from injury (or reduce its likelihood or severity) during a collision involving the vehicle 102 by providing a cushion between the occupant 104 and interior structures of the vehicle 102, so that the occupant 104 will be prevented from being thrown into the interior structures and/or, in some instances, being ejected from the vehicle 102.

Figure 2:
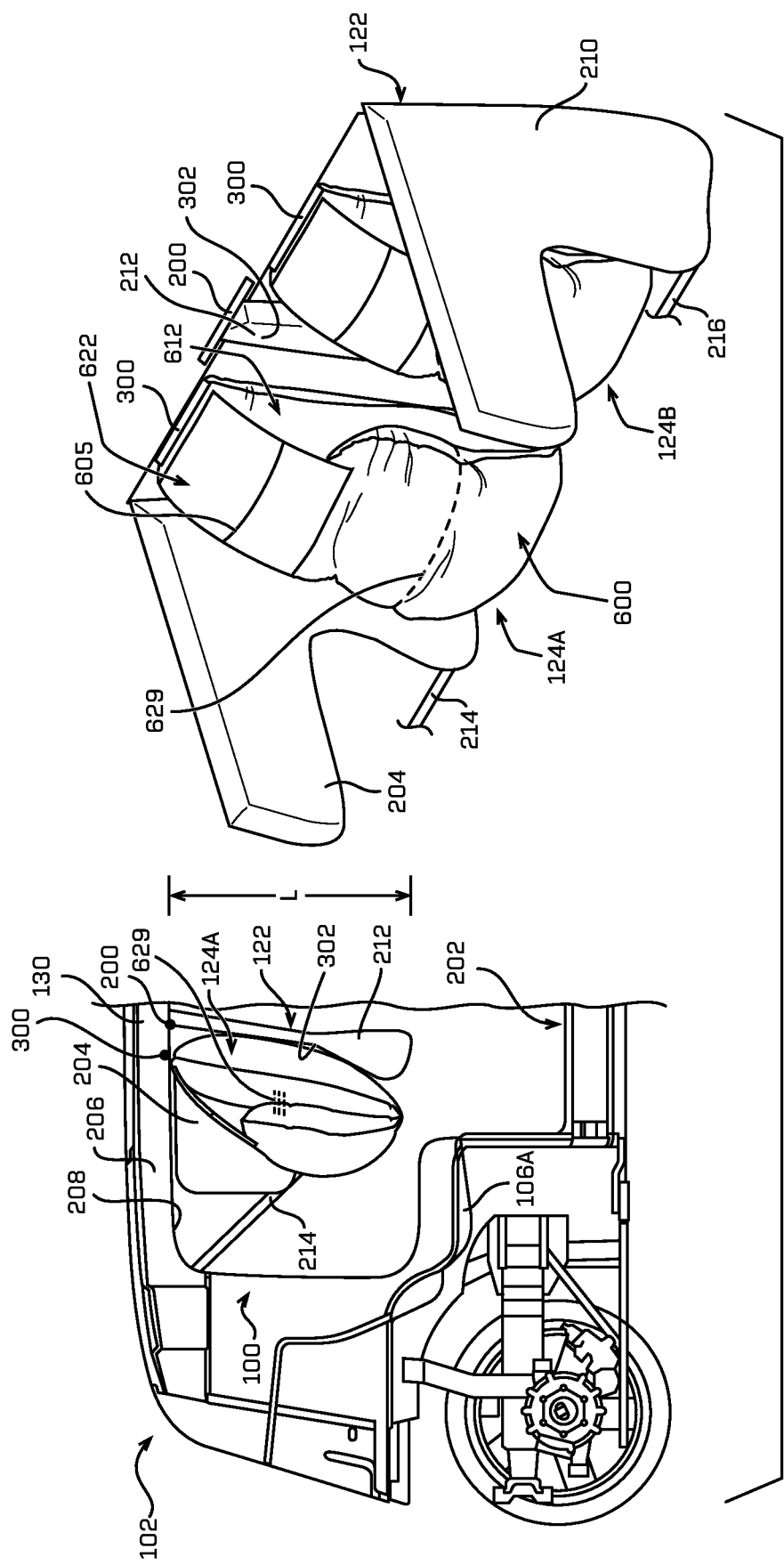
FIG. 2 is a partial side view of the example vehicle shown in FIG. 1 with an example expandable curtain in a deployed state and example expandable bladders shown in a first phase of the deployed state.

FIG. 2 is a side view of a portion of the example vehicle 102 shown in FIG. 1 with the occupants 104 omitted to aid clarity. FIG. 2 shows an example expandable curtain 122 in the deployed (e.g., expanded) state in the interior 100 of the vehicle 102. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling. The example expandable curtain 122 may be configured to be expanded from a stowed state, for example, as shown in FIG. 1, to a deployed state as shown having a length L as shown in FIG. 2. The expandable bladder 124 may likewise be configured to be expanded from a stowed, for example, as shown in FIG. 1 state to a deployed as shown, for example, in FIGS. 2-8B and having a length L as shown in FIG. 2. As shown, in some examples, the expandable curtain 122 extends toward the vehicle floor 202 and terminates at a location spaced above the vehicle floor 202. In some examples, the expandable curtain 122 may extend to and terminate at the vehicle floor 202. In the example shown, the expandable curtain 122 in the deployed state may include first side 204 configured to extend along a portion of a first interior side 206 of the vehicle 102. For example, the first side 204 of the expandable curtain 122 may extend in a direction substantially parallel to the first interior side 206 of the vehicle 102.

In some examples, the first side 204 of the expandable curtain 122 may be deployed from a housing located above the opening 208 in the first interior side 206 and/or from the vehicle roof 130 of the vehicle 102. In some examples, the first side 204 of the expandable curtain 122 may be inflatable and may be configured to provide cushioning between the occupant 104 and the first interior side 206 of the vehicle 102.

In some examples, the expandable curtain 122 may also include a second side 210 opposite the first side 204 configured to extend along a portion of a second interior side (not shown in FIG. 2 due to limitations of the view provided) of the vehicle 102. The first and second interior sides of the vehicle 102 may be on opposite sides of the vehicle 102 and may extend substantially parallel to one another. In some examples, the second side 210 of the expandable curtain 122 may have structural, location, stowage, and/or deployment characteristics similar to, or the same as, the first side 204 of the expandable curtain 122, except that it may be located on the second interior side of the vehicle 102 and may be different to accommodate differences with being on the second interior side of the vehicle 102 instead of the first interior side 206.

The example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define a substantially U-shaped cross-sectional area as created by a plane normal to length extending downward from the roof 130 to the floor 202. In some examples, the first side 204, the second side 210, and the transverse portion 212 of the expandable curtain 122 form a continuous barrier. In some examples, one or more of the first side 204, the second side 210, or the transverse portion 212 of the expandable curtain 122 may include an additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of the interior trim of the vehicle 102 configured to permit the expandable curtain to deploy from underneath the trim.

In some examples, the occupant protection system 120 may include a first tether 214 coupled to the first side 204 and/or transverse portion 212 of the expandable curtain 122 and coupled to a portion of the vehicle 102, such as, for example, a portion associated with (e.g., directly or indirectly coupled to) the first interior side 206 (e.g., an interior panel or a structural member of the vehicle chassis 128) the floor 202, or the roof 130 of the vehicle 102, for example. For example, the first tether 214 may at one end be coupled to a free edge of the first side 204 of the expandable curtain 122, and at a second end coupled to an anchor associated with the first interior side 206 of the vehicle 102 and/or the vehicle roof 130. The occupant protection system 120 may also include a second tether 216 coupled to the second side 210 and/or transverse portion 212 of the expandable curtain 122 and configured to be coupled to a portion of the vehicle 102, such as, for example, a portion associated with (e.g., directly or indirectly coupled to) the second interior side, the floor 202, or the roof 130 of the vehicle 102, for example, in manner at least similar to the first tether 214. In some examples, the first and second tethers 214 and 216 may assist with preventing the expandable curtain 122, once deployed, from swinging in a direction away from the occupant 104 during the collision, for example, as the occupant 104 contacts the expandable curtain 122, either directly or indirectly, as explained herein.

FIG. 2 shows an example occupant protection system 120 with the example expandable curtain 122 and a first example expandable bladder 124A and second example second expandable bladder 124B each in a deployed (e.g., expanded) state. The deployed state shown in FIG. 2 is shown as an example of a first phase of deployment, as discussed below. It should be appreciated that in various examples, the occupant protection systems herein may not include an expandable curtain 122. The example expandable curtain 122 and/or the example expandable bladders 124A, 124B may be configured to be expanded from a stowed state, for example, as shown in FIG. 1, to the first phase of a deployed state, for example, as shown in FIG. 2. In some examples, the expandable curtain 122 may be indirectly coupled to and supported by the vehicle roof 130, for example, via an intermediate coupling.

In the example shown, each of the expandable bladders 124A and 124B has been deployed from the vehicle roof 130 and are coupled to the vehicle roof 130 at attachment points 300. For example, the expandable bladders 124A and 124B shown in FIG. 2 have expanded from a stowed state to a first phase of a deployed state (discussed further below), and are associated with (e.g., directly or indirectly coupled to) the transverse portion 212 of the expandable curtain 122, for example, such that the expandable curtain 122 may support the expandable bladders 124A and 124B when an occupant 104 contacts one of the expandable bladders 124A or 124B as the occupant 104 is urged forward in the direction toward which the seat 106 is facing and into the expandable bladders 124A and 124B (i.e., from left-to-right as shown in FIG. 2). For example, the transverse portion 212 of the expandable curtain 122 includes a support face side 302 facing the seat 106 and the expandable bladders 124A and 124B, and as the occupant 104 contacts one of the expandable bladders 124A or 124B, the expandable bladder 124A or 124B presses against the support side face 302 of the expandable curtain 122. The expandable curtain 122, suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 106 is facing and the direction in which the occupant 104 is moving. In this example manner, the occupant protection system 120 may protect the occupant 104 during a collision involving the vehicle 102, by preventing the occupant 104 from colliding in an un-cushioned or unprotected manner with interior structures of the vehicle 102 and/or, in some instances, preventing the occupant 104 from being ejected from the vehicle 102.

In the example shown in FIG. 2, at least a portion of the first side 204 of the expandable curtain 122 and at least a portion of the second side 210 of the expandable curtain 122 extend away from the support face side 302 of the of the transverse portion 212 of the expandable curtain 122. In some examples, one or more of the expandable bladders 124A or 124B may be associated with (e.g., directly or indirectly coupled to) the support face side 302 of the transverse portion 212 and may be located between the first side 204 and the second side 210 of the expandable curtain 122, for example, as shown in FIG. 2.

Figure 3:
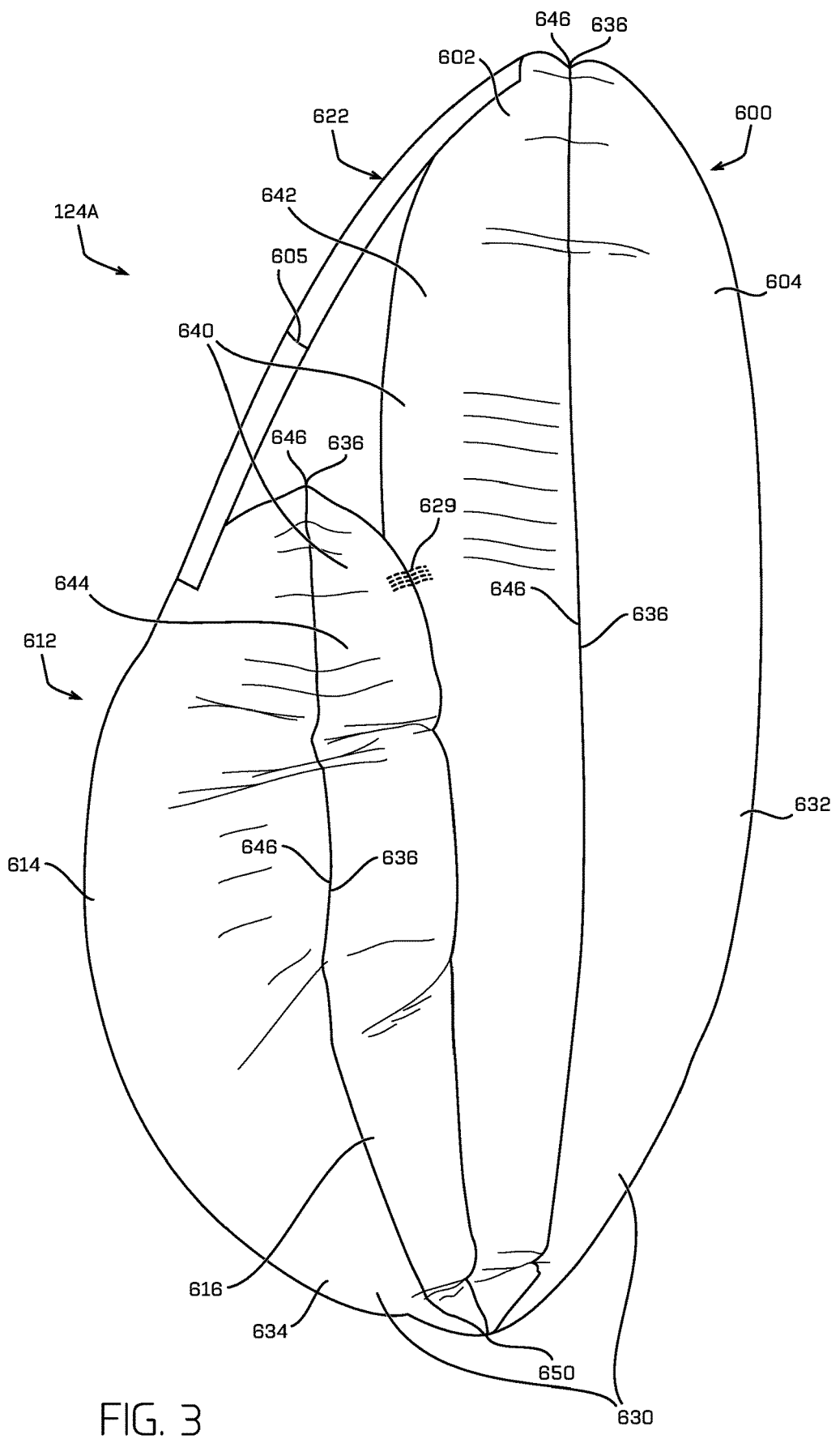
FIG. 3 is a perspective side view of one of the example expandable bladders shown in FIG. 3.

The first expandable bladder 124A and/or the second expandable bladder 124B may each be configured to expand from a stowed state to a deployed state associated with the transverse portion 212 of the expandable curtain 122, for example, as shown in FIG. 3. In some examples, the first expandable bladder 124A and/or the second expandable bladder 124B may be coupled to the transverse portion 212 of the expandable curtain 122. In some examples, the first expandable bladder 124A and/or the second expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the first side 204, the second side 210, and/or the transverse portion 212 of the expandable curtain 122 may be configured such that when the expandable curtain 122 is deployed, the lower edge of the transverse portion 212 is closer to the seat 106 toward which the first side 204 and second side 210 extend than the upper portion of the transverse portion 212, thereby resulting in the transverse portion 212 extending downward toward the floor of the vehicle 102 and creating an angle relative to vertical, for example, as shown in FIG. 3. This angle may be created by a contraction of the first side 204 and/or the second side 210 as the expandable curtain 122 is deployed. This example configuration results the lower edge of the expandable curtain 122 being closer to the lower portion of the chest an occupant in the seat 106 than an upper portion of the chest and/or head of the occupant upon deployment. This creates a surface against which the first and/or second expandable bladders 124A and 124B may react and which results in arresting the lower portion of the chest of the occupant and allowing the upper chest and/or head of the occupant to continue forward and pivot downward into/against one of the expandable bladders 124 as the occupant is arrested by the expandable bladder 124.

In some examples, the deployment control system 126 (FIG. 1) may be configured to cause one or more of the first expandable bladder 124A, the second expandable bladder 124B, or the expandable curtain 122 to expand from the stowed state to the deployed state (e.g., an expanded state), for example, by activating one or more inflators 134 (FIG. 1) associated with (e.g., in flow or fluid communication with) one or more of the first expandable bladder 124A, the second expandable bladder 124B, or the expandable curtain 122. The first expandable bladder 124A, the second expandable bladder 124B, and the expandable curtain 122 may be deployed together, concurrently or substantially simultaneously, or may be deployed independently of one another. For example, the deployment control system 126 may be configured to cause the expandable curtain 122 to deploy and/or expand from the stowed state to the deployed state at a first time, and thereafter cause the first expandable bladder 124A and/or the second expandable bladder 124B to expand from the stowed state to the deployed state at a second time following the first time. In some examples, the first expandable bladder 124A or the second expandable bladder 124B may be deployed individually, for example, without necessarily deploying the other of the expandable bladders. By deploying the expandable curtain 122 and/or the expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second expandable bladders 124A and 124B and expandable curtain 122. Additionally, or alternatively, by deploying the expandable curtain 122 and/or the expandable bladders 124A or 124B independently, replacement costs may be minimized, as only those deployed members would need replacing or refurbishing.

The example vehicle 102 shown in FIG. 1 and FIG. 2 may include a first seat 106A coupled to a portion the vehicle 102 and facing the first direction 114 relative to a longitudinal axis of the vehicle 102, and the vehicle 102 may also include a second seat 106B (FIG. 1) coupled to a portion the vehicle 102 and facing a second direction 116 opposite the first direction 114. In some examples of the occupant protection system 120, the first side 204 of the expandable curtain 122 and the second side 210 of the expandable curtain 122 may extend from the transverse portion 212 of the expandable curtain 122 in the second direction 116 toward the first seat 106A. The first expandable bladder 124A may be configured to deploy between the transverse portion 212 of the expandable curtain 122 and the first seat 106A.

Examples of the vehicles and occupant protection systems herein may include first and second expandable curtains at least partially stowed in a portion of the vehicle 102 and configured to be expanded from a stowed state to a deployed state extending between the vehicle roof 130 and the vehicle floor 202. Details of example first and second expandable curtains are discussed further in U.S. application Ser. No. 15/963,641 (U.S. Pat. No. 10,471,923), which is incorporated herein by reference in its entirety. In some such examples, protection may be provided for occupants of seats facing both directions. For example, the seats 106A and 106B may face one another, for example, as shown in FIG. 1, and the first and second expandable curtains 122A and 122B may be configured to deploy between the two seats 106A and 106B. In some examples, the deployment control system 126 may be configured to receive one or more signals indicative of a direction of travel of the vehicle 102, and cause deployment of the first expandable curtain and/or the second expandable curtain. For example, the first expandable curtain, the first expandable bladder 124A, the second expandable curtain 122B, and/or the second expandable bladder 124B may be deployed based at least in part on the one or more signals indicative of the direction of travel of the vehicle 102.

For example, if the vehicle 102 is traveling with the first seat 106A facing the direction of travel (e.g., the first direction 114), before or during a collision, the deployment control system 126 may deploy the first expandable curtain and/or the first expandable bladder (e.g., associated with (e.g., within an effective distance from) the first seat 106A), and if the vehicle 102 is traveling with the second seat 106B facing the direction of travel (e.g., the second direction 116), before or during a collision, the deployment control system 126 may deploy the second expandable curtain and/or the second expandable bladder (e.g., associated with (e.g., within an effective distance from) the second seat 106B).

Figure 4:
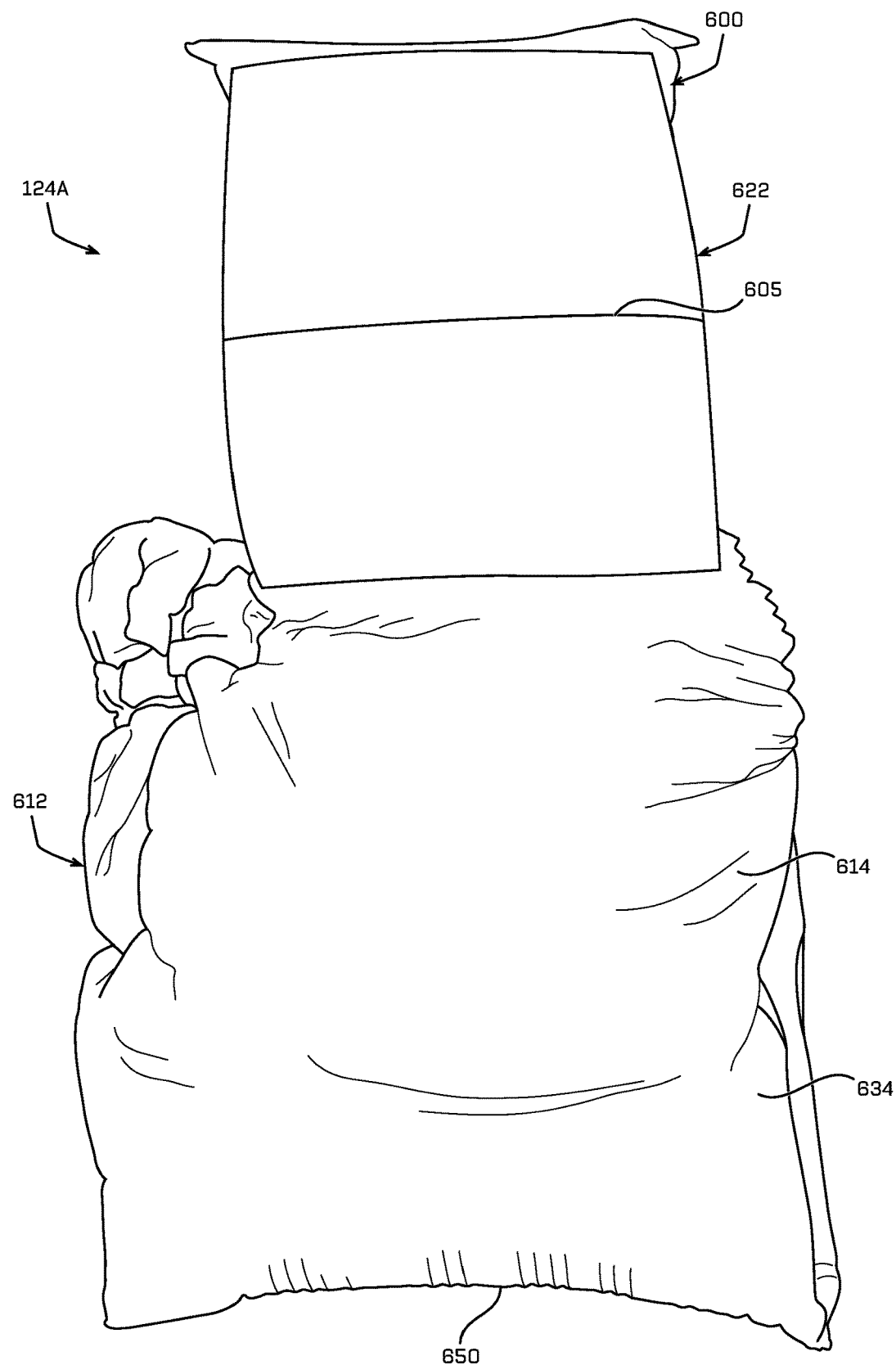
FIG. 4 is a perspective front view of the example expandable bladder of FIG. 3.
Figure 5:
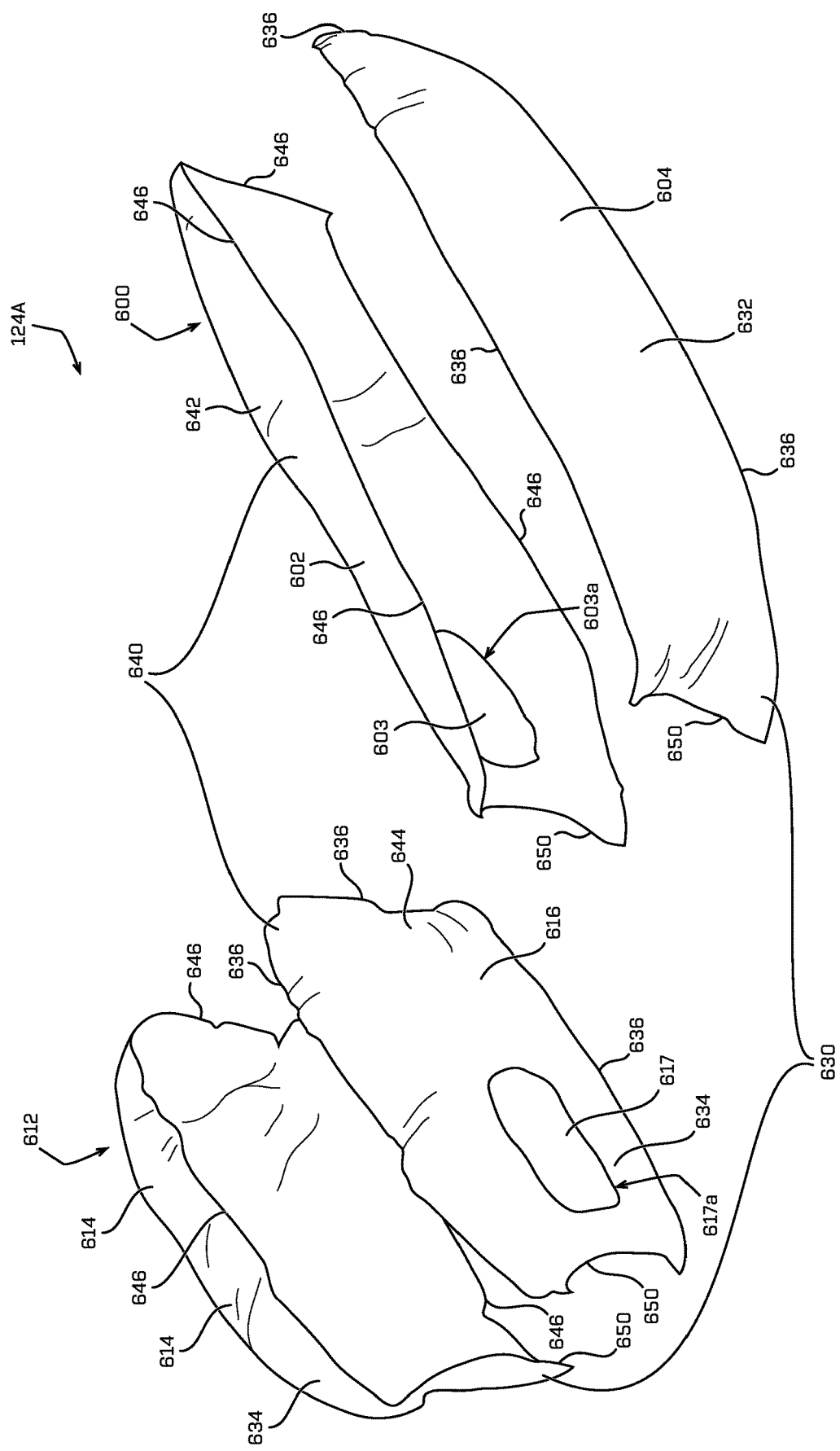
FIG. 5 is an exploded view of an example expandable bladder.

Turning now to FIGS. 3-5, FIG. 3 is a perspective side or lateral view of the example expandable bladder 124A. FIG. 4 is a perspective front or occupant/passenger facing view of example expandable bladder 124A. FIG. 5 is an exploded view of the example expandable bladder 124A (with the tearable flap 622, discussed below, omitted). It should be appreciated that, while the example expandable bladder 124A of FIGS. 3-5 is shown removed from the vehicles described herein, example expandable bladder 124A may operate with any of the example vehicles, systems or methods described herein including with the expandable curtains and deployment control systems described herein. It should also be appreciated that while FIGS. 3-5 illustrate a single example expandable bladder 124A, other example expandable bladders of the present disclosure (e.g., example expandable bladder 124B shown in FIG. 2) may comprise the same or similar structure and operation as described with respect to example expandable bladder 124A.

Thus, referring primarily to FIGS. 3-5, the example expandable bladder 124A may comprise a first or initial expandable chamber 600 and a second or occupant restraining expandable chamber 612. The initial expandable chamber 600 may comprise an occupant facing portion 602 that is configured to generally face in the direction of an occupant or passenger of a vehicle (e.g., passenger 104 in FIG. 1 or passenger 804 in FIGS. 8A, 8B discussed below) in, for example, a deployed state of the expandable bladder 124A. The initial expandable chamber 600 may further comprise a rear portion 604 that is configured to generally face a direction opposite to the occupant facing portion 602 in, for example, the deployed state of the expandable bladder 124A. The occupant facing portion 602 may comprise or define an opening 603 having a perimeter 603a.

The occupant restraining expandable chamber 612 may comprise an occupant contacting portion 614 having a surface that is generally configured to contact or face an occupant or passenger of a vehicle (e.g., passenger 104 in FIG. 1 or passenger 804 in FIGS. 8A, 8B discussed below) in, for example, a deployed state of the expandable bladder 124A. The occupant restraining expandable chamber 612 may further comprise a rear portion 616 that is generally opposite the occupant contacting portion 614 in, for example, a deployed state of the expandable bladder 124A. The rear portion 616 of the occupant restraining expandable chamber 612 may comprise or define an opening 617 having a perimeter 617a. In examples, opening 617 of the rear portion 616 of occupant restraining expandable chamber 612 may be similarly or identically shaped to opening 603 of occupant facing portion 602 of initial expandable chamber 600. In examples, the occupant facing portion 602 of initial expandable chamber 600 may be attached to the rear portion 616 of occupant restraining expandable chamber 612 at or around at least a portion of the respective perimeters 617a and 603a of openings 617, 603. In examples, the connection or attachment of occupant facing portion 602 to the rear portion 616 at or around at least a portion of perimeters 603a, 617a may be via any suitable stitching technique or any other suitable attachment technique(s).

In examples, the example expandable bladder 124A may comprise a releasable connection (e.g., a releasable connection element such as a tearable flap 622) that may be configured to release a connection of the occupant restraining expandable chamber 612 to the initial expandable chamber 602 or to the vehicle (e.g., via a connection, either directly or indirectly, to the vehicle roof 130 or an area associated with the vehicle roof 130). In various examples, an end portion of the tearable flap 622 may be connected to a portion of initial expandable chamber 600, while an opposite end portion of the tearable flap 622 may be connected to another portion of occupant restraining expandable chamber 612. In examples, the connection of tearable flap 622 to initial expandable chamber 600 may be located an end or edge portion of initial expandable chamber 600. The end or edge portion may be nearest the vehicle roof 130. In examples, the connection of tearable flap 622 to occupant restraining expandable chamber 612 may be at an end or edge portion of occupant restraining expandable chamber 612 (e.g., along a seam of chamber 612). In examples, tearable flap 622 may comprise a tearable seam 605 that is configured to rip or tear, when for example, the expandable bladder 124A is in the deployed state, as discussed below. It should be appreciated from the description herein, that in various examples, instead of, or in addition to, the tearable flap 622, the releasable connection of expandable bladder 124A may be any suitable connection or connection technique that allows the connection between the occupant restraining expandable chamber 612 and the initial expandable chamber 600 or the vehicle (e.g., the vehicle roof 130) to be disconnected or released (i.e., disconnected) during the deployed state of the bladder 124A, as described herein. In one example, the releasable connection may comprise a tearable seam or stitching 629 that connects the occupant restraining expandable chamber 612 to the initial expandable chamber 600. The tearable seam or stitching 629 may in examples extend laterally across a width of the occupant restraining expandable chamber 612 and the initial expandable chamber 600 and be configured to release or disconnect the chamber 612 from the chamber 600 in the deployed state. In other examples, the releasable connection may comprise an adhesive that connects the occupant restraining expandable chamber 612 to the initial expandable chamber 600, which adhesive may be configured to release or disconnect in the deployed state. It should further be appreciated from the description herein, that each of the releasable connections described herein are configured to enable the occupant restraining expandable chamber 600 to move generally in a direction towards an occupant of the vehicle in the deployed state.

In examples, the expandable bladder 124A may comprise a first panel 630 and a second panel 640. The second panel 640 may be connected to or attached to the second panel 640. The first panel 630 may be similarly shaped and sized to the second panel. In some examples, first panel 630 may be formed of, or comprise, a first generally rectangular flat piece of material, while second panel 640 may be formed of, or comprise, a second generally rectangular flat piece of material that is similarly shaped and sized to the rectangular flat piece of material of the first panel 630. The material of first panel 630 and second panel 640 may be in various examples comprise the same material, e.g., woven nylon fabric and/or other similar materials, or materials having suitable characteristics for the vehicles and occupant protection systems described herein. The first panel 630 may comprise an initial expandable section 632 and an occupant restraining section 634. The second panel 640 may similarly comprise an initial expandable section 642 and an occupant restraining section 644. It should therefore be appreciated that in examples, the initial expandable chamber 600 may comprise, or be defined by, both the initial expandable section 632 of the first panel 630 and the initial expandable section 642 of the second panel 640, while the occupant restraining expandable chamber 612 may comprise, or be defined by, both the occupant restraining section 634 of the first panel 630 and the occupant restraining section 644 of the second panel 640.

In examples, the first panel 630 may be attached to the second panel 640 at, or along, a chamber connecting seam 650. The chamber connecting seam 650 may in examples separate or define a boundary between the initial expandable chamber 600 and the occupant restraining expandable chamber 612. In examples, the initial expandable chamber 600 and/or the occupant restraining expandable chamber 612 may be foldable or hingeable about the chamber connecting seam 650 to allow expandable bladder 124A to be positioned in a folded arrangement in the stowed state of a vehicle and to allow the expandable bladder 124A to be expanded from the stowed state to the deployed state, as described herein. In examples, the connecting seam 650 may be configured to at least substantially prevent gas from flowing through the connecting seam 650. The seam 650 may therefore prevent gas from flowing from initial expandable chamber 600 to the occupant restraining expandable chamber 612 through seam 650. First panel 630 may comprise edge or perimeter portions 636. Second panel 640 may similarly comprise edge or perimeter portions 646. In examples, first panel 630 may be connected or attached to second panel 640 at least along, or at, edge portions 636, 646. In various examples, the connection or attachment of first panel 630 to second panel 640 along, or at, edge portions 636, 646 may be any suitable stitching technique or any other suitable attachment device or technique that allows chambers 600, 612 to expand in the deployed state and contain gas within the chamber 600, 612 in the deployed state.

Figure 7:
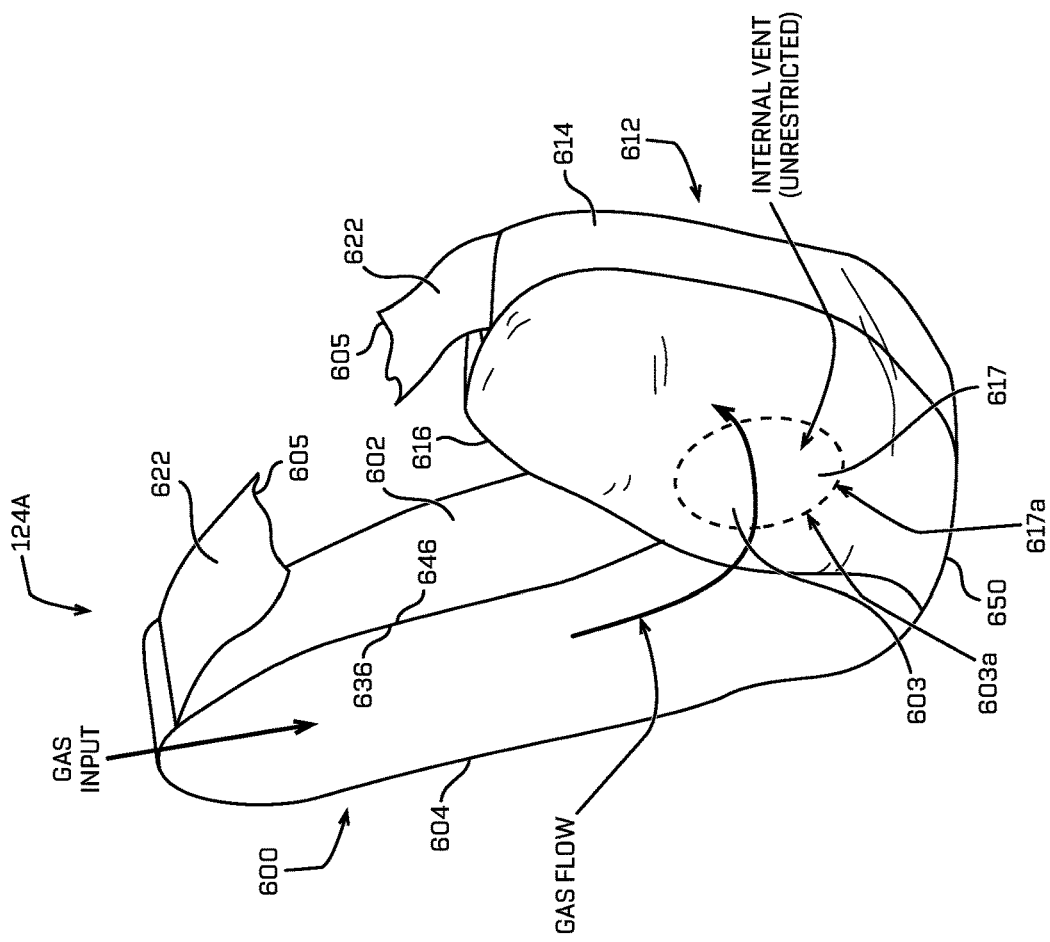
FIG. 7 is a schematic illustration of an example expandable bladder shown in a second phase of a deployed state.
Figure 6:
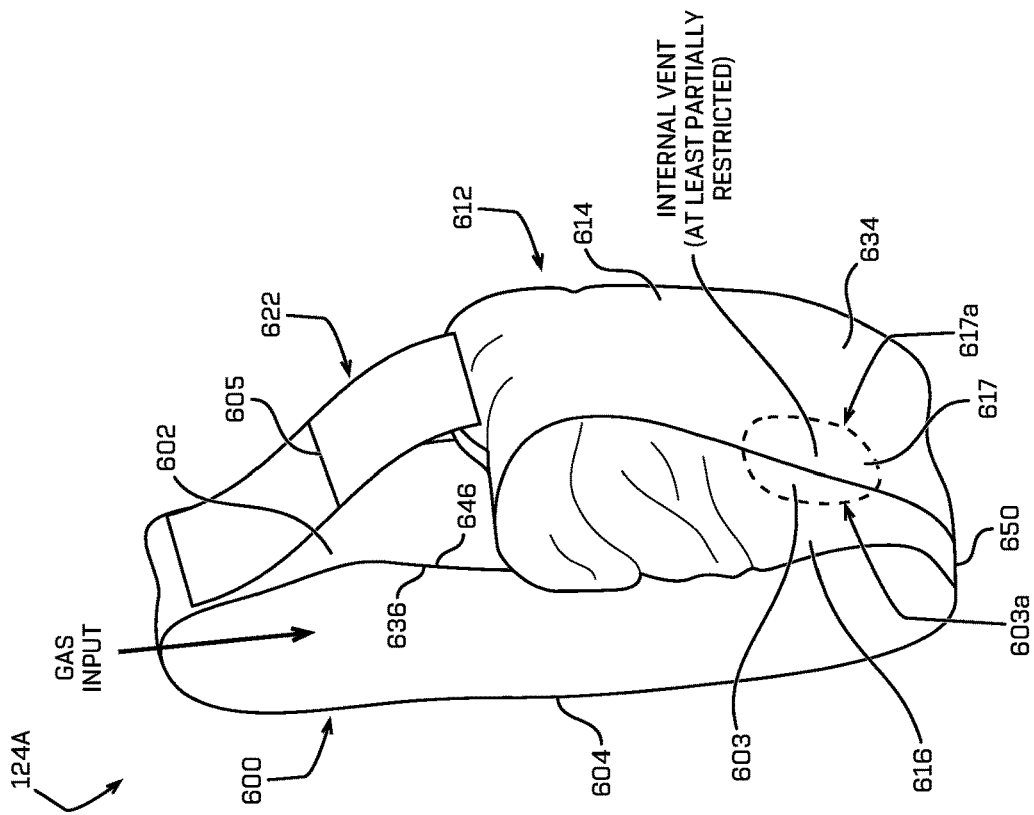
FIG. 6 is a schematic illustration of an example expandable bladder shown in a first phase of a deployed state.

Referring now to FIGS. 6 and 7, FIGS. 6 and 7 illustrate schematically an example of a first phase (FIG. 6) and a second phase (FIG. 7) of the deployed state of example expandable bladder 124A. It should be appreciated that the example expandable bladder 124A of FIGS. 6 and 7 may be positioned in a stowed state prior to the deployment, and the deployment control system 126 may be configured to control the deployment of the expandable bladder 124A from the stowed state to the deployed state. In examples, the deployment control system 126 may be configured, as described herein, to activate one or more inflators 134 that are in flow or fluid communication with the expandable bladder 124A such that inflators 134 provide a gas or fluid to the expandable bladder 124 to cause expandable bladder 124A to expand from the stowed state (FIG. 1) to the first and second phases of the deployed state (i.e., FIGS. 6 and 7, respectively). It should be appreciated that the example expandable bladder 124A may be configured to deploy (i.e., deploy from the first phase to the second phase), for example, in less than 100 milliseconds or less than 50 millisecond in examples. In one example the expandable bladder 124A may be configured to expand or deploy to the second phase in 70 milliseconds. In one example, the first phase of the deployed state described herein may occur in 45 milliseconds or less. It should further be appreciated that any one or more of the expanded curtains discussed herein may likewise be deployed to operate with example expandable bladder 124A.

In the first phase of the example deployed state illustrated in FIG. 6, the initial expandable chamber 600 and occupant restraining expandable chamber 612 may initially drop from a stowed position in the vehicle roof 130 or in an area associated with vehicle roof 130, moving in a substantially downward or vertical direction (e.g., in a direction from vehicle roof 130 generally towards vehicle floor 202) as a gas flows into the initial expandable chamber 600. The gas flowing into initial expandable chamber 600 may be via one or more inflator 134 being controlled or activated by the deployment control system 126, as described herein. The gas that first fills or flows into initial expandable chamber 600 in the first phase is at least substantially prevented from flowing through chamber connecting seam 650 (or entirely prevented from flowing) due to the design/attachment of the connecting seam 650. In examples, the gas that first fills or flows into the initial expandable chamber 600 is also at least partially restricted from flowing through openings 603 and 617 (of initial expandable chamber 600 and occupant restraining expandable chamber 612, respectively) and thus at least partially restricted from flowing from initial expandable chamber 600 into occupant restraining expandable chamber 612. This gas flow restriction in examples may be due to the occupant contacting portion 614 of chamber 612 at least partially covering or blocking both of the openings 617, 603 (of occupant restraining expandable chamber 612 and initial expandable chamber 600, respectively). In the example first phase of the deployed state, the occupant contacting portion 614 may therefore function like a partially or fully closed valve that restricts the flow of gas from initial expandable chamber 600 to occupant restraining expandable chamber 612 through openings 603, 617. This valve like functioning is at least in part due to the tearable flap 622 holding the occupant restraining expandable chamber 612 in position relative to initial expandable chamber 600, thereby constraining movement of occupant restraining expandable chamber 612 relative to initial expandable chamber 600 (e.g., constraining or preventing chamber 612 from freely moving in a longitudinal direction towards an occupant, such as the direction from right to left in FIGS. 8A, 8B).

In the second phase of the example deployed state illustrated in FIG. 7, the tearable flap 622 is shown as ripped or torn along seam 605. The tearing of flap 622 allows the occupant restraining expandable chamber 612 to move more freely relative to initial expandable chamber 600 (e.g., in a longitudinal direction towards an occupant, such as a direction from right to left in FIGS. 8A, 8B). The tearing thus allows the occupant contacting portion 614 of occupant restraining expandable chamber 612 to come into contact and arrest, or restrain, movement of an occupant during, for example, a collision as the occupant is moving forward in a direction opposite to the movement of the occupant restraining expandable chamber 612 (e.g., in a longitudinal direction from left to right in FIGS. 8A, 8B). It should therefore be appreciated that the gas flow through openings 603, 617 in the second phase of the deployed state is at least substantially unrestricted (or completely unrestricted), and thus gas flow from initial expandable chamber 600 to occupant restraining expandable chamber 612 through openings 603, 617 is substantially (or completely) unrestricted. The unrestricted gas flow in examples may be due to occupant contacting portion 614 of chamber 612 no longer being in a position that at least partially covers or blocks openings 603, 617. This partial (or full) uncovering or unblocking of openings 603, 617 in examples may be due in part to flap 622 having been ripped and thus no longer constraining or holding initial expandable chamber 600 in an at least partially immovable position relative to occupant restraining expandable chamber 612 or no longer constraining movement of occupant restraining expandable chamber 612 relative to initial expandable chamber 600. It should be understood that in examples, flap 622 may be caused to tear in the deployed state due to the gas pressure in initial expandable chamber 600 increasing to a level sufficient to cause the seam 605 of flap 622 to tear (i.e., while the gas is at least substantially restricted from flowing into the chamber 612) and/or due to the inertia or force resulting from the initial expandable chamber 600 dropping from the stowed state of the vehicle. It should also be appreciated that in various examples, instead of each chamber 600, 612 comprising or defining openings 603, 617, the operation of sequentially restricting and then allowing gas to flow from initial expandable chamber 600 to occupant restraining expandable chamber 612 may be controlled or performed via any suitable air flow restraining element(s) that at least partially restrain or restrict the flow of air or fluid from the initial expandable chamber 600 to the occupant restraining expandable chamber 612 in the first phase of the deployed state. In examples, such air flow restraining element may be one or more valve elements positioned in the expandable bladder 124A. In various examples, the one or more valve elements may be one or more relief valves positioned in expandable bladder 124A at, for example, a location where openings 603, 617 are illustrated.

Figure 8A:
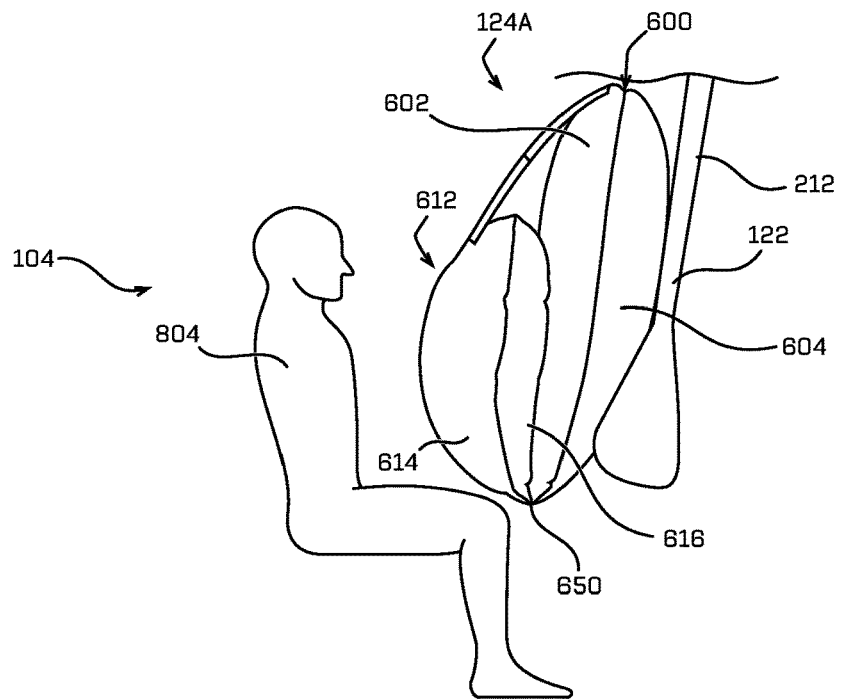
FIG. 8A is a schematic diagram showing an example vehicle occupant before contacting an example expandable bladder supported by an example expandable curtain.
Figure 8B:
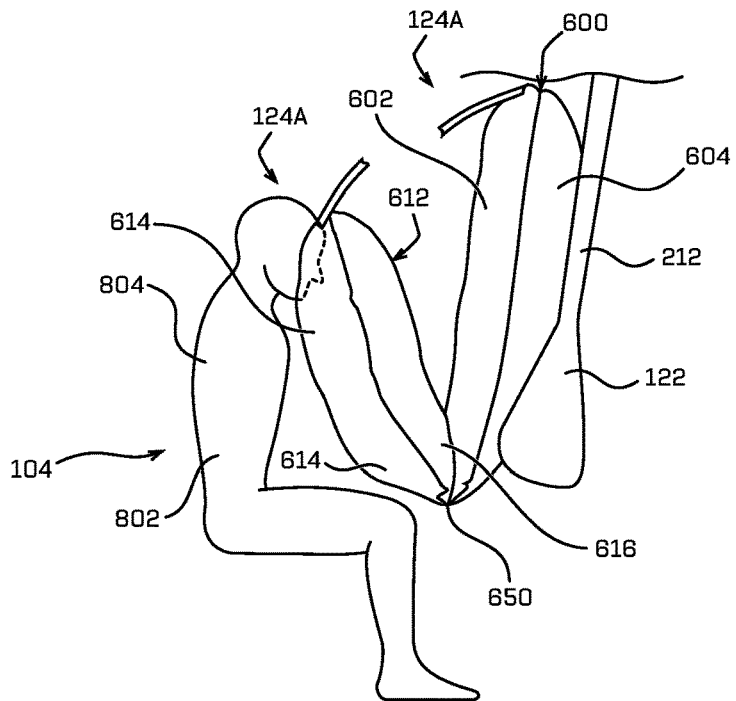
FIG. 8B is a schematic diagram showing the example occupant from FIG. 8A contacting the example expandable bladder.

FIGS. 8A and 8B are schematic sequence views of example first and second phases, respectively of a deployed state of an example occupant 104 during a collision involving a vehicle including an example occupant protection system 120. In the examples shown, the occupant protection system 120 includes an expandable curtain 122 comprising at least a transverse portion 212 suspended from the vehicle roof 130, and an expandable bladder 124A suspended from the vehicle roof 130. It should be appreciated that openings 603, 617 have been omitted from FIG. 8A and FIG. 8B merely for ease of illustration. FIG. 8A shows the example expandable bladder 124A in an example first phase of a deployed state in which the occupant 104 is seated in seat 106 and tearable flap 622 is untorn. In this example first phase, gas flow from the initial expandable chamber 600 to occupant restraining expandable chamber 612 is at least substantially restricted (e.g., at least partially restricted from flowing through openings 603, 617) as described above. As explained herein, in some examples the deployment control system 126 may receive one or more signals from the vehicle 102 indicative of a collision or a predicted collision involving the vehicle 102, and the deployment control system 126 may activate one or more inflators 134 to deploy the expandable curtain 122 and/or the expandable bladder 124A. In some examples, only expandable bladders 124 associated with seats 106 in which occupants 104 have been detected will be deployed. For example, only expandable bladders 124 in front of and close enough to the occupied seats that would be effective in arresting or restraining movement of the respective occupants during a collision will be deployed.

FIG. 8B shows an example second phase of the deployed state in which (i) the releasable connection (in this example a tearable flap 622) is torn, (ii) the occupant restraining expandable chamber 612 has moved towards the occupant 104 in the vehicle (i.e., moved in a direction from right to left in FIG. 8B), and (iii) the occupant 104 has been thrown forward in the vehicle 102 during a collision (i.e., the occupant 104 has moved in a direction from left to right in FIG. 8A and FIG. 8B). In this example second phase, gas flow from the initial expandable chamber 600 to the occupant restraining expandable chamber 612 is substantially unrestricted as described above (e.g., gas flow is unrestricted through openings 603, 617). In the example shown, the occupant's head 800 is thrown forward into the occupant restraining expandable chamber 612 of expandable bladder 124A, which is supported by the expandable curtain 122. The occupant restraining expandable chamber 612 thereby arrests or restrains forward movement of the occupant 104 in a cushioned manner to reduce the likelihood of injury to the occupant 104. In examples, the occupant's head 800 contacts the occupant contacting portion 614 of chamber 612, which chamber 612 has moved more freely relative to initial expandable chamber 600 due to the disconnection or releasing of the releasable connection as described herein (here the tearing or ripping of tearable flap 622 along seam 605).

It should be appreciated from the foregoing examples that the sequential or two phase deployment of the airbag or example expandable bladder 124A enables much of the deployment energy to be absorbed during the filling and dropping of initial expandable chamber 600 (i.e., during the first phase of deployment). Thus, the force that occupant restraining expandable chamber 612 may apply to an occupant during deployment (e.g., during a vehicle collision) can be minimized. This may be particularly advantageous in that it can reduce the amount of force acting on shorter occupants (e.g., a child) during a vehicle collision. It should also be appreciated that the design of expandable bladder 124A described herein, including the first panel 630 attached to the second panel 640 as described herein, may simply the manufacturing process of bladder 124A. The design of the initial expandable chamber 600 comprising a first panel 630 attached to a second panel 640 as described herein also minimizes the expanded volume of initial expandable chamber 600, which reduces then amount of energy required to expand or inflate chamber 612 (and hence the entire bladder 124A). The design of example bladder 124A as described herein can therefore reduce the amount of fabric and weight needed for bladder 124A and the amount of gas needed to inflate or deploy bladder 124A (and thus the size and amount of power/gas needed of the gas inflator).

Figure 9:
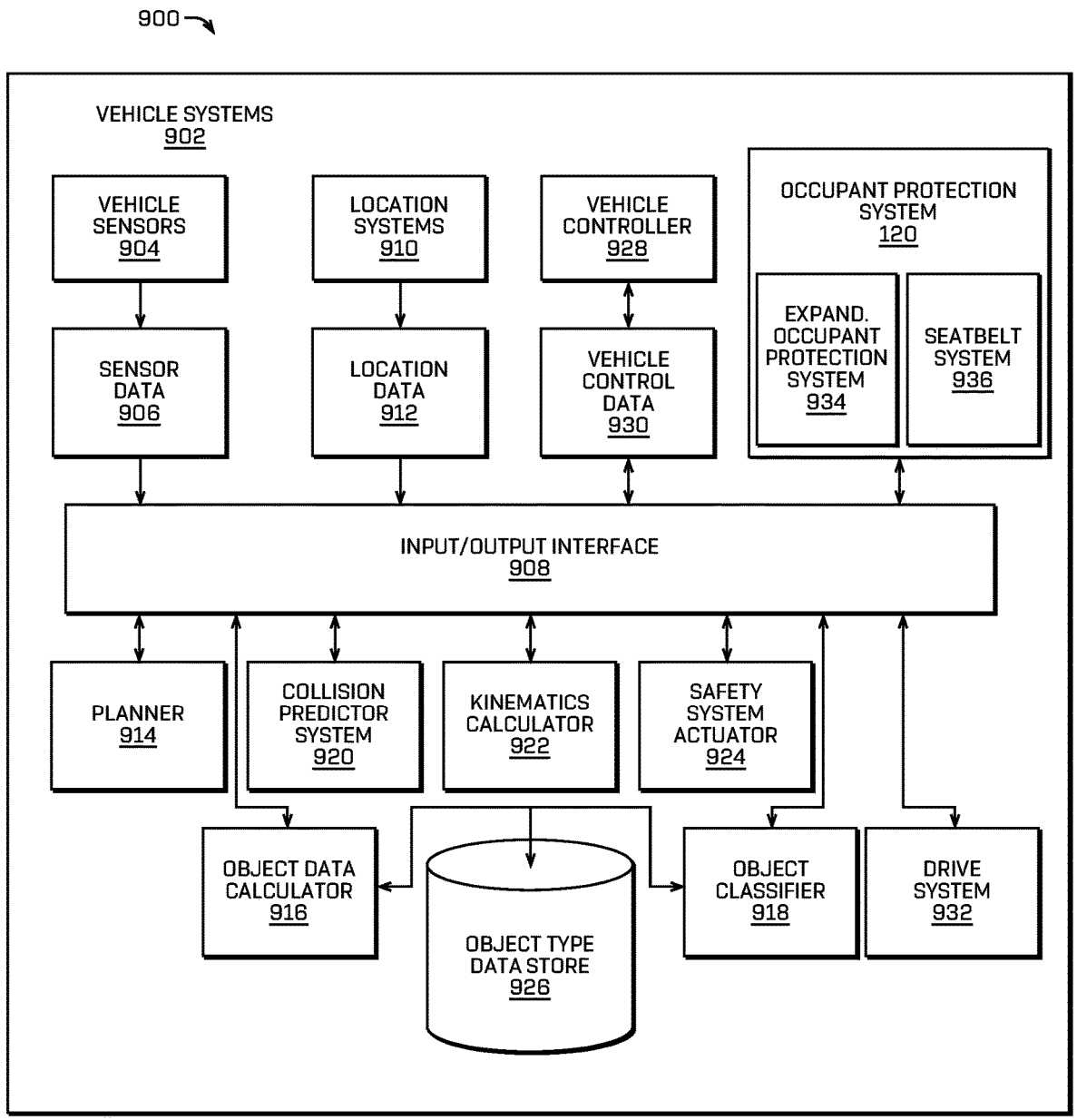
FIG. 9 is a block diagram showing an example architecture for vehicle systems including an example occupant protection system.

FIG. 9 is a block diagram of an example architecture 900 including vehicle systems 902 for controlling operation of the systems that provide data associated with operation of the vehicle 102, and that control operation of the vehicle 102. In various implementations, the architecture 900 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 900 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 900 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 900 shown in FIG. 9, the example vehicle systems 902 include a plurality of vehicle sensors 904, for example, configured to sense movement of the vehicle 102 through the environment, sense environmental data, such as the ambient temperature, pressure, and humidity, and/or sense objects in the environment surrounding the vehicle 102. In some examples, the vehicle sensors 904 may include sensors configured to identify a location on a map. The vehicle sensors 904 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 904 may also include, for example, inertial measurement units (IMUs), accelerometers, and gyroscopes. The vehicle sensors 904 may be configured to provide sensor data 906 representative of the sensed objects and signals to the vehicle systems 902 via, for example, an input/output (I/O) interface 908. Other types of sensors and sensor data are contemplated.

The example vehicle systems 902 also include location systems 910 configured to receive location information, including position and orientation data (e.g., a local position or local pose) from the vehicle sensors 904 and/or external sources, and provide location data 912 to other portions of the vehicle systems 902 via the I/O interface 908. The external sources may include global satellites for facilitating operation of a global positioning system (GPS) and/or a wireless network for communicating and receiving information related to the vehicle's location, such as map data. The location systems 910 may also include sensors configured to assist with navigation of the vehicle 102, such as wheel encoders for sensing the rotation of the wheels, inertial navigation sensors, such as gyroscopes and/or accelerometers, and/or cameras, LIDAR, RADAR, etc. for obtaining image data for dead-reckoning navigation and/or SLAM-based approaches to localization.

The example vehicle systems 902 may also include one or more of a planner 914, an object data calculator 916, an object classifier 918, a collision predictor system 920, a kinematics calculator 922, and a safety system actuator 924. The vehicle systems 902 may be configured to access one or more data stores including, but not limited to, an object type data store 926. The object type data store 926 may include data representing object types associated with object classifications for objects detected in the environment.

The example vehicle systems 902 shown in FIG. 9 also include a vehicle controller 928 configured to receive vehicle control data 930, and based on the vehicle control data 930, communicate with a drive system 932 (e.g., a steering system, a propulsion system, suspension system, and/or a braking system) to control operation of the vehicle 102. For example, the vehicle control data 930 may be derived from data received from one of more of the vehicle sensors 904 and one or more of the planner 914, the object data calculator 916, the object classifier 918, the collision predictor system 920, the kinematics calculator 922, and the safety system actuator 924, and control operation of the drive system 932, so that operation and maneuvering of the vehicle 102 is executed.

In some examples, the planner 914 may be configured to generate data representative of a trajectory of the vehicle 102, for example, using data representing a location of the vehicle 102 in the environment and other data, such as local pose data, that may be included in the location data 912. In some examples, the planner 914 may also be configured to determine projected trajectories predicted to be executed by the vehicle 102. The planner 914 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 914 may be configured to predict more than a single predicted object trajectory. For example, the planner 914 may be configured to predict multiple object trajectories based on, for example, probabilistic determinations or multi-modal distributions of predicted positions, trajectories, and/or velocities associated with an object.

In some examples, the object data calculator 916 may be configured to provide data representative of, for example, one or more of the location of an object in the environment surrounding the vehicle 102, an object track associated with the object, and an object classification associated with the object. For example, the object data calculator 916 may be configured to receive data in the form of sensor signals received from one or more of the vehicle sensors 904 and determine data representing one or more of the location in the environment of the object, the object track, and the object classification.

In some examples, the object classifier 918 may be configured to access data from the object type data store 926, which may be configured to store data representing object types, such as, for example, a species of an object classification, a subclass of an object classification, and/or a subset of an object classification. The object classifier 918, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 920 may be configured to use the data representing the object type, the data representing the trajectory of the object, and/or the data representing the trajectory of the vehicle 102, to predict a collision between the vehicle 102 and the object.

In some examples, the kinematics calculator 922 may be configured to determine data representing one or more scalar and/or vector quantities associated with motion of objects in the environment, including, but not limited to, velocity, speed, acceleration, deceleration, momentum, local pose, and/or force. Data from the kinematics calculator 922 may be used to compute other data, including, but not limited to, data representing an estimated time to impact between an object and the vehicle 102, and data representing a distance between the object and the vehicle 102. In some examples, the kinematics calculator 922 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 922 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 924 may be configured to activate one or more safety systems of the autonomous vehicle 102 when a collision is predicted by the collision predictor 920 and/or the occurrence of other safety related events, such as, for example, an emergency maneuver by the vehicle 102, such as hard braking or a sharp acceleration. The safety system actuator 924 may be configured to activate an interior safety system (e.g., including sending one or more signals to the deployment control system 126 of the occupant protection system 120), an exterior safety system (e.g., including warning sounds and/or warning lights), the drive system 932, which may be configured to execute an emergency maneuver to avoid a collision, and/or any combination thereof. For example, the drive system 932 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

Some examples of the vehicle systems 902 may operate according to the following example. Data representing a trajectory of the vehicle 102 in the environment may be received by the vehicle controller 928. Object data associated with an object in the environment may be calculated. Sensor data 906 from one or more of the vehicle sensors 904 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 916, based on the object data, may be used to determine data representing the object's location in the environment, data representing whether the object is moving, and data representing a classification associated with the object.

In some examples, the planner 914 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 920 may be used to predict a collision between the vehicle 102 and an object in the environment based on the object type, whether the object is moving, the trajectory of the vehicle 102, the predicted path of the object obtained from the planner 914. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 924 may be configured to actuate one or more portions of a safety system of the vehicle 102 when a collision is predicted. For example, the safety system actuator 924 may activate one or more safety systems of the vehicle 102, such as, for example, one or more of the interior safety systems, one or more of the exterior safety systems, and one or more of the components of the drive system 932 (e.g., the steering system, the propulsion system, and/or the braking system) via the vehicle controller 928. In some examples, the vehicle controller 928 may determine that the interior safety system will be activated based on some action of an object in the environment, and the vehicle control data 930 may include information configured to cause the vehicle controller 928 to activate one or more functions of the interior safety system, the exterior safety system, and the drive system 932.

As shown in FIG. 9, the example vehicle systems 902 also include the occupant protection system 120, which may operate as described herein. In some examples, the occupant protection system 120 may include an expandable occupant protection system 934 and a seatbelt system 936, which may be in communication with other vehicle systems 902 via the input/output interface 908. For example, the occupant protection system 120 may be in communication with the safety system actuator 924, and the deployment control system 126 may receive one or more signals from the vehicle systems 902 and activate the portions of the expandable occupant protection system 934, for example, as described herein.

Figure 10:
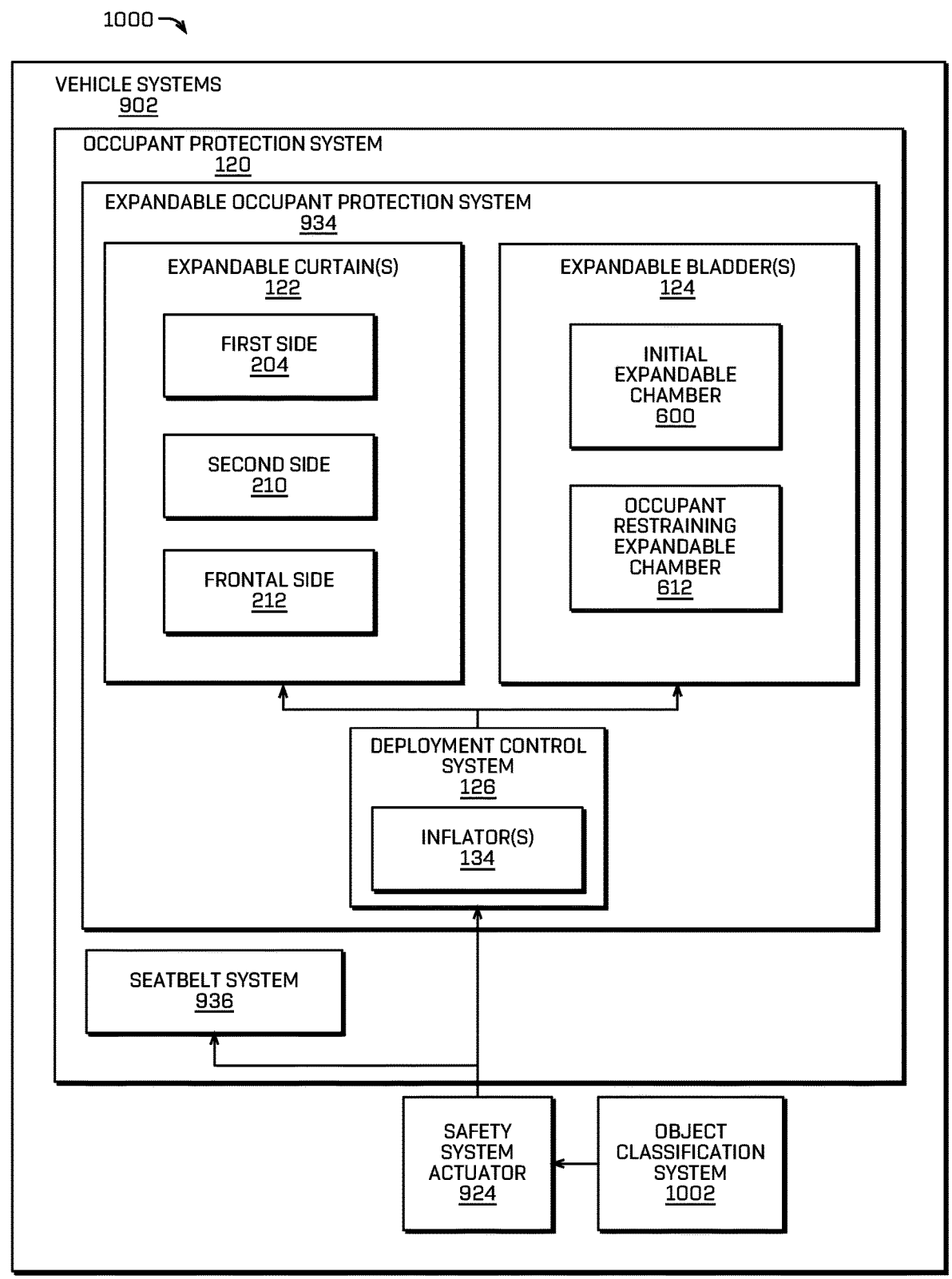
FIG. 10 is a block diagram including an example architecture for an occupant protection system.

FIG. 10 shows an example architecture 1000 including the vehicle systems 902 and the example occupant protection system 120. In the example shown, the example occupant protection system 120 includes an expandable occupant protection system 934 and a seatbelt system 936, which controls operation of systems related to the seatbelts in the vehicle 102. In the example shown, the expandable occupant protection system 934 includes one or more expandable curtains 122 and one or more expandable bladders 124, for example, expandable bladder 124A, 124B, as described herein. The expandable curtain(s) 122 may include one or more of a first side 204, a second side 210, and a transverse portion 212 extending between the first side 204 and second side 210 and, in some examples, coupling the first and second sides 204 and 210 to one another. The expandable bladder(s) 124 may include one or more of a first initial expandable chamber 600 and a second occupant restraining expandable chamber 612, as described herein.

In the example architecture 1000 shown in FIG. 10, the occupant protection system 120 also includes a deployment control system 126, which may include one or more inflators 134 configured to supply fluid and/or gas to the expandable curtain(s) 122 and/or the expandable bladder(s) 124, for example, when activated by the deployment control system 126, as described herein.

In some examples, the deployment control system 126 may be configured to receive a signal indicative of a predicted collision involving the vehicle 102 and/or a collision involving the vehicle 102, and cause deployment of one or more expandable curtains 122, and/or one or more expandable bladders 124 based at least in part on the signal(s). For example, the vehicle sensors 904 may provide information to the collision predictor system 920, which may predict a collision with an object in the environment through which the vehicle 102 is travelling. The collision predictor system 920 may provide information to the safety actuator system 924, which in turn, provides one or more signals to the deployment control system 126, which may activate one more inflators 134 to cause deployment of one or more expandable curtains 122 and/or one or more expandable bladders 124.

In some examples, the deployment control system 126 may be configured to receive one or more signals indicative of the presence of an occupant 104 in a first location of the vehicle 102 associated with (e.g., within an effective range of) one of the expandable bladders 124, and cause deployment of the corresponding expandable bladder 124 associated with the position of the occupant 104 based at least in part on the one or more signals. For example, the vehicle systems 902 may include an object classification system 1002 configured to determine information related, for example, to whether an object and/or occupant 104 is present in one or more of the respective seats 106 of the vehicle 102. In some examples, the object classification system 1002 may leverage one or more of the vehicle sensors 904 and determine information about the object and/or occupant 104, such as, for example, the size and/or weight of the object and/or occupant 104 (e.g., whether the occupant 104 is an adult, a child, or an infant). As a non-limiting example, image systems (e.g., cameras) internal to the vehicle 102 may determine presence of an occupant 104 in a seat 106. If no occupant 104 is present, the deployment control system 126 may receive one or more signals associated with whether an occupant 104 is in the seat 106, for example, via the safety system actuator 924, and based at least in part on the one or more signals, determine whether to initiate deployment of, before or during a collision, the expandable curtain 122 and/or the expandable bladder 124 associated with (e.g., within an effective range of) the seat 106. For example, if an occupant 104 is not present in the seat 106, the deployment control system 126 may not initiate deployment of the expandable curtain 122 or the expandable bladder 124. This may prevent unnecessary deployment and prevent costs associated with servicing deployed parts of the occupant protection system 120. Alternatively, if an occupant 104 is present in the seat 106, the deployment control system 126 may initiate deployment of the expandable curtain 122 and/or the expandable bladder 124 associated with (e.g., within an effective range of) the position of the occupant 104 to protect the occupant 104 during the collision.

In some examples, the deployment control system 126 may be configured to receive one or more signals indicative of whether the occupant 104 is properly wearing a seatbelt, and cause and/or control deployment of the expandable curtain 122 and/or the expandable bladder 124 associated with the position of the occupant 104 based at least in part on the one or more signals indicative of whether the occupant 104 is properly wearing the seatbelt. For example, the vehicle sensors 904 and/or vehicle systems 902 may determine whether the occupant 104 is properly wearing a seatbelt. The deployment control system 126 may receive one or more such signals and, based at least in part on the signals, initiate and/or control deployment of the expandable curtain 122 and/or the expandable bladder 124 before or during a collision involving the vehicle 102.

For example, if the occupant 104 is wearing a seatbelt, the deployment control system 126 may reduce the deployment rate and/or the deployment volume (or pressure) of the expandable curtain 122 and/or expandable bladder 124, for example, since the seatbelt will be expected to assist with preventing injury to the occupant 104 during the collision. If, on the other hand, the occupant 104 is not properly wearing a seatbelt, the deployment control system 126 may maintain or increase the deployment rate and/or the deployment volume (or pressure) of the expandable curtain 122 and/or expandable bladder 124, for example, since the seatbelt will not be expected to assist with preventing injury to the occupant 104 during the collision.

In some examples, deployment of the expandable curtain 122 and/or one or more of the expandable bladders 124 may be affected by a number of parameters. For example, the deployment rate, the deployment volume (or pressure), the timing of deployment, and/or the sequence of deployment of one or more of the expandable curtain 122 or the expandable bladders 124 may be altered based at least in part on one or more parameters, such as, for example, the severity of a collision impact, whether one or more occupants 104 is/are properly wearing a seatbelt, and/or the size and/or weight of the occupant(s) 104 (e.g., depending on whether the occupant is an adult, a child, or an infant).

In some examples, the expandable curtain 122 and one or more of the expandable bladders 124 may be deployed independently from one another. For example, the expandable curtain 122 may be deployed without deploying any of the expandable bladders 124. For example, if objects are detected in the interior 100 of the vehicle 102 and a rapid change in the speed and/or direction of travel of the vehicle 102 occurs, the expandable curtain 122 alone may be deployed to prevent objects in the vehicle 102 from being tossed around inside the vehicle 102 during the rapid change in speed and/or direction. This may be particularly useful when, for example, an occupant 104 is in a seat 106 facing a seat 106 on which one or more objects have been placed. Upon the rapid change of speed and/or direction, the expandable curtain 122 may be deployed in order to prevent the one or more objects from being thrown from the seat 106 opposite the occupant 104 into the occupant 104.

The deployment control system 126, in some examples, may be configured to receive one or more signals indicative of a direction of travel of the vehicle 102, and cause deployment of the expandable curtain 122 and/or the expandable bladder 124 based at least in part on the one or more signals indicative of the direction of travel of the vehicle 102. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., along a direction of travel) or the seat 106 is facing rearward (i.e., opposing a direction of travel). The deployment control system 126 may be configured to prevent deployment of the expandable curtain 122 and/or the expandable bladder 124 associated with the seat 106, even when occupied, for example, when the seat 106 is facing rearward based at least in part on the signals. This may prevent unnecessary deployment and costs associated with servicing deployed parts of the occupant protection system 120. Alternatively, if the seat 106 is facing forward, the deployment control system 126 may initiate deployment of the expandable curtain 122 and/or the expandable bladder 124 associated with the position of the seat 106 to protect the occupant 104 during the collision, for example, as described herein.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 900 and 1000 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 900 and 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 900 and 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 900 and 1000 may be transmitted to the architectures 900 and 1000 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A: A vehicle comprising: a chassis comprising a roof and a floor; an expandable bladder at least partially stowed in a portion of the vehicle associated with the roof and configured to be expanded from a stowed state to a deployed state having a length configured to extend at least a portion of a distance between the roof and the floor, the expandable bladder comprising: an initial expandable chamber, an occupant restraining expandable chamber, and a releasable connection releasably connecting the occupant restraining expandable chamber to the initial expandable chamber or to the roof; an inflator configured to provide a gas to the expandable bladder; and a deployment control system configured to, based upon a signal received from the vehicle, cause the inflator to provide the gas to the expandable bladder to thereby cause the expandable bladder to expand from the stowed state to the deployed state, and wherein (i) the gas provided to the expandable bladder flows initially to the initial expandable chamber and thereafter to the occupant restraining expandable chamber, (ii) in the deployed state, the releasable connection releases the connection of the occupant restraining expandable chamber to the initial expandable chamber or to the roof, and (iii) the deployed state comprises (a) a first phase in which the gas flow from the initial expandable chamber to the occupant restraining expandable chamber is at least substantially restricted, and (b) a second phase in which gas flow from the initial expandable chamber to the occupant restraining chamber is unrestricted.

B: The vehicle as paragraph A describes, wherein the releasable connection comprises a tearable flap having a tearable seam configured to tear in the deployed state.

C: The vehicle as paragraph A describes, comprising: a first seat facing a first direction relative to a longitudinal axis of the vehicle, and wherein the releasing of the releasable connection enables the occupant contacting portion of the occupant restraining expandable chamber to move in a second direction opposite the first direction.

D: The vehicle as paragraph A describes, wherein: the expandable bladder comprises: a first panel comprising an initial expandable section, and an occupant restraining section, a second panel attached to the first panel, the second panel comprising an initial expandable section, and an occupant restraining section, and the initial expandable chamber comprises the initial expandable sections of the first and second panels, and the occupant restraining expandable chamber comprises the second occupant restraining sections of the first and second panels.

E: The vehicle as paragraph D describes, wherein the first panel is attached to the second panel along a chamber connecting seam, the chamber connecting seam separating the initial expandable chamber from the occupant restraining expandable chamber.

F: The vehicle as paragraph A describes, wherein: the initial expandable chamber comprises an occupant facing portion comprising an opening, and a rear portion opposite the occupant facing portion, and the occupant restraining expandable chamber comprises an occupant restraining portion, and a rear portion opposite the occupant restraining portion, the rear portion of the occupant restraining expandable chamber comprising an opening, and in the second phase of the deployed state, the gas flows from the initial expandable chamber to the occupant restraining expandable chamber through the opening in the occupant facing portion of the initial expandable chamber and through the opening in the rear portion of the occupant restraining expandable chamber.

G: A vehicle occupant protection expandable bladder comprising: an initial expandable chamber; an occupant restraining expandable chamber; a releasable connection configured to releasably connect the occupant restraining expandable chamber to the initial expandable chamber or to the vehicle, and wherein (i) the vehicle occupant protection expandable bladder is configured to be expanded from a stowed state to a deployed state in a vehicle, (ii) in the deployed state, the releasable connection is configured to release the connection of the occupant restraining expandable chamber to the initial expandable chamber or to the vehicle, and (iii) the deployed state comprises (a) a first phase in which gas flow from the initial expandable chamber to the occupant restraining expandable chamber is at least substantially restricted, and (b) a second phase in which gas flow from the initial expandable chamber to the occupant restraining chamber is unrestricted.

H: The vehicle occupant protection expandable bladder that paragraph G describes, further comprising an air flow restraining element configured such that (i) in the first phase of the deployed state, the air flow restraining element at least substantially restricts gas flow from the initial expandable chamber to the occupant restraining expandable chamber, and (ii) in the second phase of deployed state, the air flow restraining element allows gas to flow unrestricted from the initial expandable chamber to the occupant restraining chamber.

I: The vehicle occupant protection expandable bladder that paragraph G describes, wherein: the initial expandable chamber comprises: an occupant facing portion comprising an opening, and a rear portion opposite the occupant facing portion, the rear portion of the initial expandable chamber comprising an opening; the occupant restraining expandable chamber comprises: an occupant restraining portion, and a rear portion opposite the occupant restraining portion, the rear portion of the occupant restraining expandable portion comprising an opening, and the vehicle occupant protection expandable bladder is configured such that in the second phase of the deployed state, gas flows from the initial expandable chamber to the occupant restraining chamber through the opening in the occupant facing portion of the initial expandable chamber and through the opening in the rear portion of the occupant restraining expandable chamber.

J: The vehicle occupant protection expandable bladder that paragraph I describes, wherein the occupant facing portion of the initial expandable chamber is attached to the rear portion of the occupant restraining expandable chamber around at least a portion of a perimeter of the opening of the occupant facing portion of the initial expandable chamber and at least a portion of a perimeter of the opening of the rear portion of the occupant restraining expandable chamber.

K: The vehicle occupant protection expandable bladder that paragraph G describes, comprising: a first panel comprising an initial expandable section, and an occupant restraining section, and a second panel attached to the first panel, the second panel comprising an initial expandable section, and an occupant restraining section, and wherein: the initial expandable chamber comprises the initial expandable sections of the first and second panels; and the occupant restraining expandable chamber comprises the occupant restraining sections of the first and second panels.

L: The vehicle occupant protection expandable bladder that paragraph K describes, wherein the first panel is attached to the second panel along a chamber connecting seam, the chamber connecting seam separating the initial expandable chamber from the occupant restraining expandable chamber.

M: The vehicle occupant protection expandable bladder that paragraph L describes, wherein the occupant restraining expandable chamber and the initial expandable chamber are at least partially foldable along the chamber connecting seam.

N: The vehicle occupant protection expandable bladder that paragraph G describes, wherein the releasable connection comprises a tearable flap having a tearable seam, the tearable seam configured to tear in the deployed state.

O: A vehicle occupant protection system comprising: an expandable bladder comprising: an initial expandable chamber, an occupant restraining expandable chamber, a releasable connection configured to releasably connect the occupant restraining expandable chamber to the initial expandable chamber or to the vehicle, wherein the expandable bladder is configured to be expanded from a stowed state to a deployed state, the deployed state comprising a first phase in which gas flow from the initial expandable chamber to the occupant restraining expandable chamber is at least substantially restricted and a second phase in which gas flow from the initial expandable chamber to the occupant restraining expandable chamber is unrestricted; and a deployment control system configured to cause the expandable bladder to expand from the stowed state to the deployed state, and wherein the second phase of the deployed state occurs after the first phase of the deployed state, and, in the deployed state, the releasable connection is configured to release the connection of the occupant restraining expandable chamber to the initial expandable chamber or to the vehicle.

P: The vehicle occupant protection system that paragraph O describes, wherein: the initial expandable chamber comprises: an occupant facing portion comprising an opening, and a rear portion opposite the occupant facing portion, the occupant restraining expandable chamber comprises: an occupant contacting portion, and a rear portion opposite the occupant contacting portion, the rear portion of the occupant restraining expandable chamber comprises an opening; and in the second phase of the deployed state, gas flows from the initial expandable chamber to the occupant restraining chamber through the opening in the occupant facing portion of the initial expandable chamber and through the opening in the rear portion of the occupant restraining expandable chamber.

Q: The vehicle occupant protection system that paragraph P describes, wherein the occupant facing portion of the initial expandable chamber is attached to the rear portion of the occupant restraining expandable chamber around at least a portion of a perimeter of the opening of the occupant facing portion of the initial expandable chamber and at least a portion of a perimeter of the opening of the rear portion of the occupant restraining expandable chamber.

R: The vehicle occupant protection system that paragraph O describes, wherein: the expandable bladder comprises: a first panel comprising: an initial expandable section, and an occupant restraining section, and a second panel attached to the first panel, the second panel comprising: an initial expandable section, and an occupant restraining section, the initial expandable chamber comprises the initial expandable sections of the first and second panels, and the occupant restraining expandable chamber comprises the occupant restraining sections of the first and second panels.

S: The vehicle occupant protection system that paragraph R describes, wherein the first panel is attached to the second panel along a chamber connecting seam, the chamber connecting seam separating the initial expandable chamber from the occupant restraining expandable chamber.

T: The vehicle occupant protection system that paragraph O describes, wherein the releasable connection comprises a tearable flap having a tearable seam configured to tear in the deployed state.

While the example clauses described above are described with respect to one particular implementation, it should be understood that, in the context of this document, the content of the example clauses may be implemented via a method, device, system, computer-readable medium, and/or another implementation. Additionally, any of examples A-T may be implemented alone or in combination with any other one or more of the examples A-T.

What is claimed is:

1. A vehicle comprising:
a chassis comprising a roof and a floor;
an expandable bladder at least partially stowed in a portion of the vehicle associated with the roof and configured to be expanded from a stowed state to a deployed state having a length configured to extend at least a portion of a distance between the roof and the floor, the expandable bladder comprising:
an initial expandable chamber,
an occupant restraining expandable chamber, and
a releasable connection releasably connecting the occupant restraining expandable chamber to the initial expandable chamber or to the roof;
an inflator configured to provide a gas to the expandable bladder; and
a deployment control system configured to, based upon a signal received from the vehicle, cause the inflator to provide the gas to the expandable bladder to thereby cause the expandable bladder to expand from the stowed state to the deployed state, and
wherein (i) the gas provided to the expandable bladder flows initially to the initial expandable chamber and thereafter to the occupant restraining expandable chamber, (ii) in the deployed state, the releasable connection releases the connection of the occupant restraining expandable chamber to the initial expandable chamber or to the roof, and (iii) the deployed state comprises (a) a first phase in which the gas flow from the initial expandable chamber to the occupant restraining expandable chamber is at least substantially restricted, and (b) a second phase in which gas flow from the initial expandable chamber to the occupant restraining chamber is unrestricted.

2. The vehicle of claim 1, wherein the releasable connection comprises a tearable flap having a tearable seam configured to tear in the deployed state.

3. The vehicle of claim 1, comprising:
a first seat facing a first direction relative to a longitudinal axis of the vehicle, and
wherein the releasable connection releases the connection of the occupant restraining expandable chamber to the initial expandable chamber such that an occupant contacting portion of the occupant restraining expandable chamber moves in a second direction opposite the first direction.

4. The vehicle of claim 1, wherein:
the expandable bladder comprises:
a first panel comprising
an initial expandable section, and
an occupant restraining section,
a second panel attached to the first panel, the second panel comprising
an initial expandable section, and
an occupant restraining section, and
the initial expandable chamber comprises the initial expandable sections of the first and second panels, and
the occupant restraining expandable chamber comprises the second occupant restraining sections of the first and second panels.

5. The vehicle of claim 4, wherein the first panel is attached to the second panel along a chamber connecting seam, the chamber connecting seam separating the initial expandable chamber from the occupant restraining expandable chamber.

6. The vehicle of claim 1, wherein:
the initial expandable chamber comprises
an occupant facing portion comprising an opening, and
a rear portion opposite the occupant facing portion, and
the occupant restraining expandable chamber comprises
an occupant restraining portion, and
a rear portion opposite the occupant restraining portion, the rear portion of the occupant restraining expandable chamber comprising an opening, and
in the second phase of the deployed state, the gas flows from the initial expandable chamber to the occupant restraining expandable chamber through the opening in the occupant facing portion of the initial expandable chamber and through the opening in the rear portion of the occupant restraining expandable chamber.

7. A vehicle occupant protection expandable bladder comprising:
an initial expandable chamber comprising an opening;
an occupant restraining expandable chamber comprising an opening;
a releasable connection configured to releasably connect the occupant restraining expandable chamber to the initial expandable chamber, and
wherein (i) the vehicle occupant protection expandable bladder is configured to be expanded from a stowed state to a deployed state in a vehicle, (ii) in the deployed state, the releasable connection is configured to release the connection of the occupant restraining expandable chamber to the initial expandable chamber, and (iii) the deployed state comprises (a) a first phase in which gas flow from the initial expandable chamber to the occupant restraining expandable chamber is at least substantially restricted, and (b) a second phase in which gas flow from the initial expandable chamber to the occupant restraining chamber is unrestricted via gas flowing through the opening of the initial expandable chamber and through the opening of the occupant restraining expandable chamber.

8. The vehicle occupant protection expandable bladder of claim 7, further comprising an air flow restraining element configured such that (i) in the first phase of the deployed state, the air flow restraining element at least substantially restricts gas flow from the initial expandable chamber to the occupant restraining expandable chamber, and (ii) in the second phase of deployed state, the air flow restraining element allows gas to flow unrestricted from the initial expandable chamber to the occupant restraining chamber.

9. The vehicle occupant protection expandable bladder of claim 7, wherein:
the initial expandable chamber comprises:
an occupant facing portion comprising the opening of the initial expandable chamber, and
a rear portion opposite the occupant facing portion;
the occupant restraining expandable chamber comprises:
an occupant restraining portion, and
a rear portion opposite the occupant restraining portion, the rear portion of the occupant restraining expandable portion comprising the opening of the occupant restraining expandable chamber, and
the vehicle occupant protection expandable bladder is configured such that in the second phase of the deployed state, gas flows from the initial expandable chamber to the occupant restraining chamber through the opening in the occupant facing portion of the initial expandable chamber and through the opening in the rear portion of the occupant restraining expandable chamber.

10. The vehicle occupant protection expandable bladder of claim 9, wherein the occupant facing portion of the initial expandable chamber is attached to the rear portion of the occupant restraining expandable chamber around at least a portion of a perimeter of the opening of the occupant facing portion of the initial expandable chamber and at least a portion of a perimeter of the opening of the rear portion of the occupant restraining expandable chamber.

11. The vehicle occupant protection expandable bladder of claim 7, comprising:
a first panel comprising
an initial expandable section, and
an occupant restraining section, and
a second panel attached to the first panel, the second panel comprising
an initial expandable section, and
an occupant restraining section, and
wherein:
the initial expandable chamber comprises the initial expandable sections of the first and second panels; and
the occupant restraining expandable chamber comprises the occupant restraining sections of the first and second panels.

12. The vehicle occupant protection expandable bladder of claim 11, wherein the first panel is attached to the second panel along a chamber connecting seam, the chamber connecting seam separating the initial expandable chamber from the occupant restraining expandable chamber.

13. The vehicle occupant protection expandable bladder of claim 12, wherein the occupant restraining expandable chamber and the initial expandable chamber are at least partially foldable along the chamber connecting seam.

14. The vehicle occupant protection expandable bladder of claim 7, wherein the releasable connection comprises a tearable flap having a tearable seam, the tearable seam configured to tear in the deployed state.

15. A vehicle occupant protection system comprising:
an expandable bladder comprising:
an initial expandable chamber comprising an opening,
an occupant restraining expandable chamber comprising an opening,
a releasable connection configured to releasably connect the occupant restraining expandable chamber to the initial expandable chamber,
wherein the expandable bladder is configured to be expanded from a stowed state to a deployed state, the deployed state comprising a first phase in which gas flow from the initial expandable chamber to the occupant restraining expandable chamber is at least substantially restricted and a second phase in which gas flow from the initial expandable chamber to the occupant restraining expandable chamber is unrestricted via the gas flowing through the opening of the initial expandable chamber and through the opening of the occupant restraining expandable chamber; and
a deployment control system configured to cause the expandable bladder to expand from the stowed state to the deployed state, and
wherein the second phase of the deployed state occurs after the first phase of the deployed state, and, in the deployed state, the releasable connection is configured to release the connection of the occupant restraining expandable chamber to the initial expandable chamber.

16. The vehicle occupant protection system of claim 15, wherein:
the initial expandable chamber comprises:
an occupant facing portion comprising the opening of the initial expandable chamber, and
a rear portion opposite the occupant facing portion,
the occupant restraining expandable chamber comprises:
an occupant contacting portion, and
a rear portion opposite the occupant contacting portion, the rear portion of the occupant restraining expandable chamber comprises the opening of the occupant restraining expandable chamber; and
in the second phase of the deployed state, gas flows from the initial expandable chamber to the occupant restraining chamber through the opening in the occupant facing portion of the initial expandable chamber and through the opening in the rear portion of the occupant restraining expandable chamber.

17. The vehicle occupant protection system of claim 16, wherein the occupant facing portion of the initial expandable chamber is attached to the rear portion of the occupant restraining expandable chamber around at least a portion of a perimeter of the opening of the occupant facing portion of the initial expandable chamber and at least a portion of a perimeter of the opening of the rear portion of the occupant restraining expandable chamber.

18. The vehicle occupant protection system of claim 15, wherein:
the expandable bladder comprises:
a first panel comprising:
an initial expandable section, and
an occupant restraining section, and
a second panel attached to the first panel, the second panel comprising:
an initial expandable section, and
an occupant restraining section,
the initial expandable chamber comprises the initial expandable sections of the first and second panels, and
the occupant restraining expandable chamber comprises the occupant restraining sections of the first and second panels.

19. The vehicle occupant protection system of claim 18, wherein the first panel is attached to the second panel along a chamber connecting seam, the chamber connecting seam separating the initial expandable chamber from the occupant restraining expandable chamber.

20. The vehicle occupant protection system of claim 15, wherein the releasable connection comprises a tearable flap having a tearable seam configured to tear in the deployed state.

* * * * *